(12) United States Patent
Kober et al.

(10) Patent No.: US 6,771,214 B2
(45) Date of Patent: Aug. 3, 2004

(54) GPS NEAR-FAR RESISTANT RECEIVER

(75) Inventors: Wolfgang Kober, Aurora, CO (US); John K. Thomas, Erie, CO (US); Robert K. Krumvieda, Westminster, CO (US)

(73) Assignee: Data Fusion Corporation, Northglenn, CO (US)

( * ) Notice: Subject to any disclaimer, the term of this patent is extended or adjusted under 35 U.S.C. 154(b) by 0 days.

(21) Appl. No.: 10/243,301

(22) Filed: Sep. 12, 2002

(65) Prior Publication Data

US 2003/0218568 A1 Nov. 27, 2003

Related U.S. Application Data

(60) Provisional application No. 60/322,914, filed on Sep. 12, 2001.

(51) Int. Cl.[7] ............................. G01S 5/02; H04B 7/185
(52) U.S. Cl. ............................. 342/357.12; 342/357.06; 701/213
(58) Field of Search ..................... 342/357.12, 357.06; 701/213

(56) References Cited

U.S. PATENT DOCUMENTS

| | | | |
|---|---|---|---|
| 642,243 A | 1/1900 | Moran et al. | |
| 4,088,955 A | 5/1978 | Baghdady | 325/56 |
| 4,309,769 A | 1/1982 | Taylor, Jr. | 375/1 |
| 4,359,738 A | 11/1982 | Lewis | 343/100 |
| 4,665,401 A | 5/1987 | Garrard et al. | 342/75 |
| 4,670,885 A | 6/1987 | Parl et al. | 375/1 |
| 4,780,885 A | 10/1988 | Paul et al. | 375/40 |
| 4,852,166 A | 7/1989 | Masson | 380/36 |
| 4,856,025 A | 8/1989 | Takai | 375/40 |
| 4,893,316 A | 1/1990 | Janc et al. | 375/44 |
| 4,922,506 A | 5/1990 | McCallister et al. | 375/1 |
| 4,933,639 A | 6/1990 | Barker | 324/309 |
| 4,965,732 A | 10/1990 | Roy, III et al. | 364/460 |
| 5,017,929 A | 5/1991 | Tsuda | 342/427 |
| 5,099,493 A | 3/1992 | Zeger et al. | 375/1 |
| 5,105,435 A | 4/1992 | Stilwell | 375/1 |
| 5,109,390 A | 4/1992 | Gilhousen et al. | 375/1 |
| 5,119,401 A | 6/1992 | Tsujimoto | 375/14 |
| 5,136,296 A | 8/1992 | Roettger et al. | 342/26 |
| 5,151,919 A | 9/1992 | Dent | 375/1 |
| 5,218,359 A | 6/1993 | Minamisono | 342/383 |
| 5,218,619 A | 6/1993 | Dent | 375/1 |
| 5,220,687 A | 6/1993 | Ichikawa et al. | 455/254 |
| 5,224,122 A | 6/1993 | Bruckert | 375/1 |
| 5,237,586 A | 8/1993 | Bottomley | 375/1 |

(List continued on next page.)

FOREIGN PATENT DOCUMENTS

| | | | |
|---|---|---|---|
| DE | 42 01 439 A1 | 7/1993 | H04L/27/00 |
| DE | 43 26 843 A1 | 2/1995 | H04B/7/08 |
| DE | 43 43 959 A1 | 6/1995 | H04B/7/08 |

(List continued on next page.)

OTHER PUBLICATIONS

U.S. patent application Ser. No. 10/141,999, Kober et al., filed May 8, 2002.

(List continued on next page.)

*Primary Examiner*—Theodore M. Blum
(74) *Attorney, Agent, or Firm*—Sheridan Ross P.C.

(57) ABSTRACT

A method and receiver are disclosed for mitigating or substantially canceling signal interference between signals detected at the receiver. Once a presumed interfering signal (s) is acquired, parameters are determined that allow the interferer(s) to be modeled. An orthogonal projection (for projecting onto a subspace orthogonal to that spanned by the interferer(s)) is applied to the composite of all signals (y) for thereby projecting y onto this subspace, wherein the subspace is non-orthogonal to a representation of desired (but interfered) signal of the composite signals. With the receiver properly equipped to perform this projection operation, interfering signals, multipath, spoofing and/or meaconing can be effectively diminished.

49 Claims, 7 Drawing Sheets

U.S. PATENT DOCUMENTS

| | | | |
|---|---|---|---|
| 5,244,122 A | 9/1993 | Botts | 222/133 |
| 5,263,191 A | 11/1993 | Dickerson | 455/304 |
| 5,272,695 A | 12/1993 | Makino et al. | 370/32.1 |
| 5,280,472 A | 1/1994 | Gilhousen et al. | 370/18 |
| 5,305,349 A | 4/1994 | Dent | 375/1 |
| 5,309,232 A | 5/1994 | Hartung et al. | 348/384 |
| 5,323,322 A | 6/1994 | Mueller et al. | 364/449 |
| 5,325,394 A | 6/1994 | Bruckert | 375/1 |
| 5,343,496 A | 8/1994 | Honig et al. | 375/1 |
| 5,347,535 A | 9/1994 | Karasawa et al. | 375/1 |
| 5,353,302 A | 10/1994 | Bi | 375/1 |
| 5,355,533 A | 10/1994 | Dickerson | 455/306 |
| 5,386,202 A | 1/1995 | Cochran et al. | 332/100 |
| 5,390,207 A | 2/1995 | Fenton et al. | 375/1 |
| 5,394,110 A | 2/1995 | Mizoguchi | 329/304 |
| 5,394,434 A | 2/1995 | Kawabe et al. | 375/205 |
| 5,396,256 A | 3/1995 | Chiba et al. | 342/372 |
| 5,412,391 A | 5/1995 | Lewis | 342/379 |
| 5,437,055 A | 7/1995 | Wheatley, III | 455/33.3 |
| 5,440,265 A | 8/1995 | Cochran et al. | 329/300 |
| 5,448,600 A | 9/1995 | Lucas | 375/205 |
| 5,481,570 A | 1/1996 | Winters | 375/347 |
| 5,513,176 A | 4/1996 | Dean et al. | 370/18 |
| 5,533,011 A | 7/1996 | Dean et al. | 370/18 |
| 5,553,098 A | 9/1996 | Cochran et al. | 375/324 |
| 5,557,284 A | 9/1996 | Hartman | 342/357 |
| 5,566,167 A | 10/1996 | Duttweiler | 370/32.1 |
| 5,602,833 A | 2/1997 | Zehavi | 370/209 |
| 6,166,690 A | 12/2000 | Lin et al. | 342/383 |
| 6,177,893 B1 | 1/2001 | Velazquez et al. | 341/118 |
| 6,252,535 B1 | 6/2001 | Kober et al. | 341/155 |
| 6,268,824 B1 | 7/2001 | Zhodzishky et al. | 342/357.04 |
| 6,282,231 B1 | 8/2001 | Norman et al. | 375/144 |
| 6,313,786 B1 | 11/2001 | Sheynblat et al. | 342/357.02 |
| 6,362,760 B2 | 3/2002 | Kober et al. | 341/141 |
| 6,392,596 B1 * | 5/2002 | Lin et al. | 342/378 |
| 6,430,216 B1 | 8/2002 | Kober et al. | 375/148 |
| 2001/0033607 A1 | 10/2001 | Fleming et al. | 375/150 |
| 2001/0046256 A1 | 11/2001 | Norman et al. | 375/148 |
| 2002/0021241 A1 | 2/2002 | Zhodzishky et al. | 342/357.02 |
| 2002/0047801 A1 | 4/2002 | Agnani et al. | 342/424 |
| 2002/0050944 A1 | 5/2002 | Sheynblat et al. | 342/357 |

FOREIGN PATENT DOCUMENTS

| | | | | |
|---|---|---|---|---|
| EP | 0 283 302 A2 | 9/1988 | | G01S/5/02 |
| EP | 0 558 910 A1 | 9/1993 | | H04B/1/16 |
| EP | 0 610 989 A2 | 8/1994 | | H04B/7/04 |
| EP | 0 648 026 A1 | 4/1995 | | H04B/7/005 |
| GB | 2 280 575 A | 2/1995 | | H04L/27/227 |
| JP | 7-74687 | 3/1995 | | H04B/7/08 |
| WO | WO 93/12590 | 6/1993 | | H04B/7/26 |
| WO | WO 98/08319 | 2/1998 | | H04B/15/00 |
| WO | WO 99/09650 | 2/1999 | | H03K/7/06 |

OTHER PUBLICATIONS

U.S. patent application Ser. No. 09/995,207, Kober et al., filed Nov. 26, 2001.

U.S. patent application Ser. No. 09/765,553, Kober et al., filed Jan. 18, 2001.

U.S. patent application Ser. No. 09/730,316, Kober et al., filed Dec. 4, 2000.

Alexander et al.; "A Linear Receiver for Coded Multiuser CDMA"; *IEEE Transactions on Communications*; May 1997; vol. 45, No. 5, pp. 605–610.

Behrens et al.; "Signal Processing Applications of Oblique Projection Operators"; *IEEE*; Jun. 1994, vol. 42, No. 6, pp. 1413–1424.

Behrens; "Subspace Signal Processing in Structured Noise"; *University of Colorado at Boulder*; 1990; pp. 1–45.

Frankel et al.; "High–Performance Photonic Analogue–digital Converter"; *Electronics Letters*; Dec. 4, 1997; vol. 33, No. 25, pp. 2096–2097.

Halper et al; "Digital–to–Analog Conversion by Pulse–Count Modulation Methods"; *IEEE*; Aug. 1996; vol. 45, No. 4, pp. 805–814.

Lin et al.; "Digital Filters for High Performance Audio Delta–Sigma Analog–to–Digital and Digital–to–Analog Conversions"; *Proceedings of ICSP*; 1996; pp. 59–63.

Ortega et al.; Analog to Digital and Digital to Analog Conversion Based on Stochastic Logic; *IEEE*; 1995; pp. 995–999.

Scharf et al.; "Matched Subspace Detectors"; *Submitted to IEEE Transactions on Signal Processing*; Jun. 1993, pp. 1–28.

Schlegel et al.; "A New Projection Receiver for Coded Synchronous Multi–User CDMA Systems"; *IEEE Transactions on Communications*; vol. 45, No. 5, p. 318.

Schlegel et al.; "Coded Asynchronous CDMA and Its Efficient Detection"; *IEEE*, Nov. 1998; vol. 44, No. 7, pp. 2837–2847.

Schlegel et al.; "Multiuser Projection Receivers"; *IEEE Journal on Selected Areas in Communications*; Oct. 1996; vol. 14, No. 8; pp. 1610–1618.

Schlegel et al.; "Projection Receiver: A New Efficient Multi–User Detector"; *IEEE*, 1995; pp. 142–145.

Thomas; "Canonical Correlations and Adaptive Subspace Filtering"; *Department of Electrical an Computer Engineering* ; 1996; pp. 1–110.

Notification of Transmittal of the International Search Report or the Declaration of PCT Patent Application Ser. No. PCT/US02/29062; Patent Cooperation Treaty; Feb. 3, 2003.

Louis L. Scharf, et al.; "Matched Subspace Detectors," *IEEE Transactions on Signal Processing*, vol. 42, No. 8 (Aug. 1994), pp. 2146–2157.

"Corrections to Matched Subspace Detectors," *IEEE Transactions on Signal Processing*, vol. 45, No. 6 (Jun. 1997), p. 1669.

* cited by examiner

GPS NEAR-FAR RESISTANT RECEIVER

CROSS-REFERENCE TO RELATED APPLICATIONS

This application makes reference to the following provisional U.S. Patent Application. The application is U.S. application Ser. No. 60/322,914 entitled "GPS Near-Far Resistant Receiver," filed Sep. 12, 2001. The entire disclosure and contents of the above applications are hereby incorporated by reference.

GOVERNMENT INTEREST STATEMENT

This invention is made with government support under contract number #F33615-98-C-1316, awarded by the United States Department of Defense. The government may have certain rights in this invention.

FIELD OF THE INVENTION

The invention relates generally to the field of radio-navigation receivers and more particularly to a method for mitigating constructive interference in a received radio-navigation signal by modeling the interference, and then subsequently removing the interference from the signal.

BACKGROUND

An example of a radio-navigation satellite system (RNSS) is the United States Global Positioning System (GPS). The GPS was established by the United States government, and employs a constellation of 24 or more satellites in well-defined orbits at an altitude of approximately 26,500 km. These satellites continually transmit microwave L-band radio signals in two frequency bands, centered at 1575.42 MHz and 1227.6 MHz., denoted at L1 and L2 respectively. These signals include timing patterns relative to the satellites onboard precision clock (which is kept synchronized by a ground station) as well as a navigation message giving the precise orbital positions of the satellites, an ionosphere model, and other useful information. GPS receivers process the radio signals, computing ranges to the GPS satellites, and by triangulating these ranges, the GPS receiver determines its position and its internal clock error.

GPS's designers assumed that all transmitters would be aboard satellites at a large and relatively constant distance from all user receivers, consequently generating signal levels at the receivers that would be weak and relatively constant. This assumption drove a number of trade-offs in system and satellite transmitter design and continues to influence receiver development even today.

Despite this assumption ground-based transmitters (known as PLs, pseudo-satellites, or simply pseudolites) have been used to complement the GPS satellites from the very beginning. In the foreseeable future, PLs may be incorporated in Unmanned Aerial Vehicles (UAVs). A PL transmits a signal with code-phase, carrier-phase, and data components with the same timing as the satellite signals and the same format. A GPS receiver acquires such a PL signal and derives code-phase pseudo-ranges or carrier-phase measurements to be used in a navigation algorithm in substantially the same manner as for a GPS satellite. The major differences are that a PL typically does not contain a high-accuracy atomic clock and that the PL position must be described in geographical terms rather than in orbital elements.

Precision navigation and landing systems require reliable and highly accurate position, velocity and time information (these aggregately denoted herein as PVT information) not achievable by standalone GPS. Precision-guided weapons require reliable PVT information to achieve acceptable Circularly Error Probable (CEP) targeting errors. To meet these requirements additional radio-navigation transmitters are needed. These transmitters can be additional satellites as specified in the Wide Area Augmentation System (WAAS) or PLs based on the ground as specified in the Local Area Augmentation System (LAAS), or on board ships, or even UAVs loitering in the air above an area of interest. WAAS and LAAS can transmit either correction data (i.e., differential data) or provide additional ranging information. When these transmitters use the GPS spectrum, as is the case for UAVs, PLs, and satellites providing ranging information, additional interference is added. This constructive interference is seen as noise to the receiver, which can degrade and in some cases prevent a receiver from acquiring and tracking the satellites.

Moreover, introduction of PLs violates one of the key assumptions of the designers of GPS. Thus, the distance between a user receiver and a PL can be large or quite small, so PL signal levels at a receiver can vary significantly. Relatively strong PL signals have the potential to overwhelm satellite signals and jam a receiver, whereas weak PL signals may be too feeble to allow receiver tracking. This is the basis for a wireless communication difficulty known in the art as the "near-far" problem.

Equally problematic is the sharing and encroachment of the GPS radio frequency spectrum from other users. Mobile Satellite Systems (MSS) downlinks, wind profiler radar, space based radar, ultra-wideband systems, GPS expansion and the European Radio Navigation Satellite System known as Galileo, have or have filed for frequencies in and around the GPS spectrum. These additional systems are potential sources and targets of interference from and to existing RNSS systems.

Another type of interference is self interference, which is the result of signals from a radio-navigation transmitter interfering with the reception of radio-navigation signals at the receiver. This type of interference often occurs when a RNSS receiver and transmitter are located physically near (or identical to) each other. Self interference is an extreme case of the "near-far" problem.

Another RNSS interference concern is spoofing and meaconing. Spoofing is a technique for causing an active radio-navigation receiver to lock onto legitimate-appearing false signals and then be slowly drawn off the desired path causing significant PVT errors. In addition, spoofers can effectively jam large geographical areas. Meaconing is a technique for the reception, delay, and rebroadcast of radio navigation signals that can confuse a navigation system or user.

In general, spoofing is more difficult to achieve than generic jamming, and is often targeted to an individual user. Spoofing, however, can achieve the same effect (widespread disruption) as jamming. This is because a spoofer can inject misleading data within a localized area and its pseudo-random number (PRN) signal will act as a highly effective jammer over large distances. A spoofer can defeat nearly all anti-jamming equipment.

In conclusion, many types of radio navigation interference exist within the RNSS RF spectrum, and it is desirable to have a method and apparatus to identify and remove such wireless interference that compromises the usefulness of legitimate radio navigation signals. In particular, it would be advantageous to reduce or mitigate the near-far problem in radio navigation.

Abbreviations

The following abbreviations are used herein.
ADC: Analog to Digital Converter
AFRL: Air Force Research Lab
C/A code—Coarse/Acquisition or Clear/Acquisition Code
CDMA—Code Division Multiple Access
CEP—Circular Error Probable
DARPA—Defense Advanced Research Projects Agency
DGPS—Differential GPS
DLL—Delay Locked Loop
DOP—Dilution of Precision
E code—European code
DSP—Digital Signal Processing
FLL—Frequency Locked Loop
GNSS—Global Navigation Satellite System (ICAO definition)
GPS—Global Positioning System
IF—Intermediate Frequency
IMU—Inertial Measurement Unit
INS—Inertial Navigation System
LAAS—Local Area Augmentation System
MAS—Multiple Access System
MFD—Matched Filter Detector (Technique used in most GPS receivers)
MSD—Matched Subspace Detector (Technique used in DFC next-generation receiver)
MSS—Mobile Satellite System
NF—Near Far
NFR—Near Far Resistant
P(Y) code—Precision (Encrypted) code
PL—Pseudolite, pseudo-satellite
PLL—Phase Locked Loop
PRN—Pseudo Random Noise code, e.g., C/A Gold codes and the P(Y) codes.
PVT—Position, Velocity, and Time
RAIM—Receiver Autonomous Integrity Monitoring
RF—Radio Frequency
RNSS—Radio Navigation Satellite System
ROC—Receiver Operating Characteristic
SA—Selective Availability
SNR—Signal to Noise Ratio
SV—Space Vehicle (e.g., an RNSS satellite)
VCO—Voltage Controlled Oscillator
UAV—Unmanned Aerial Vehicles
UMP—Uniformly Most Powerful
USAF—United States Air Force
WAAS—Wide Area Augmentation System

Terms and Definitions

It is advantageous to define several terms before describing the invention. It should be appreciated that the following definitions are used throughout this application. Where the definition of terms departs from the commonly used meaning of the term, applicant intends to utilize the definitions provided below, unless specifically indicated.

GPS Codes: Each GPS satellite or PL at least transmits two different codes such codes typically include: a coarse/acquisition (C/A) code and a precision (encrypted) (P(Y)) code. Each C/A-code is a unique sequence of 1023 bits, called chips, which is repeated each millisecond. The duration of each C/A-code chip is about 1 micro-second. The chip width or wavelength is about 300 meters. The rate of the C/A-code chips, called chipping rate, is 1.023 MHz (or magachips/sec or Mcps). A P-code is a unique segment of an extremely long ($\approx 10^{14}$ chips) PRN sequence. The chipping rate is 10.23 Mcps, i.c., ten times that for a C/A-code, and the chip width is about 30 meters. The smaller wavelength results in greater precision in the range measurements than that for the C/A-codes.

Wireless Signal Model:
Let a wireless navigation signal y be modeled as follows:

$$y = H\theta + S\phi + n \quad (1)$$

where
- H is a representation of the desired or target signal (i.e., a vector) for which interference is to be diminished;
- $\theta$ is the amplitude on the target signal H;
- $\phi$ is a vector of amplitudes applied on the matrix S of interference signals;
- n is the noise and S $$S = [s_1 s_2 \ldots s_N] \quad (2)$$

$s_1$ is the interference signal i.

Near-Far Interference: The commingling of two or more different wireless signals from one or more wireless sources in such a manner that when the commingled signal is received, one of the signals is sufficiently strong (and likely from a source nearer to the receiver) so that it overwhelms a weaker commingled signal (likely from a source, e.g., farther from the receiver). In particular, the stronger signal may "leak" such that there is sufficient signal cross correlation to compromise the accurate detection of the weaker signal.

Near-Far (NF) interference can occur both in military and civilian environments and be from friendly or hostile sources. Friendly sources include PseudoLites (PLs) placed at, for example, airports to enhance navigation. Unfortunately the strong PLs signal can actually interfere with the receiver's ability to acquire and track the satellite signals thereby unintentionally denying the ability to navigate.

Hostile interference is found in the military arena where a hostile force deploys ground or air based PLs with the intent of confusing GPS receivers within an area. Any type of military hardware that uses a GPS receiver is susceptible. This includes: aircraft, vehicles, command and control, and even GPS guided munitions.

Structured interference: Is any wireless (e.g., radio) interference source whose signals can be predictively modeled.

Self-Interference: Wireless signal interference that occurs when a receiver is collocated (i.e., located within proximity sufficient to induce interference) with a transmitter. Self interference is the result of signals transmitted from a radio-navigation transmitter interfering with a radio-navigation signal received on the same antenna as used for transmitting. This type of interference often occurs when a receiver doubles as a transmitter. Self interference is an extreme case of "Near-Far" interference.

Spoofing, Meaconing & Jamming Interference: Spoofing is used to cause an active radio-navigation receiver to lock onto legitimate-appearing false signals and then be slowly drawn off the desired path causing significant PVT errors. In addition, spoofers effectively jam large areas. Meaconing is the reception, delay, and rebroadcast of radio navigation signals to confuse a navigation system or user.

Higher Order DLL, FLL, PLL: Generally, the order of a phase locked loop (PLL) is 1 higher than the order of the loop filter. If the loop filter is omitted, i.e., if the output of the phase detector directly controls a voltage controlled oscillator (VCO), a first-order PLL is obtained. The term "order" is defined herein as the exponent on the largest term in the filter polynomial. As one of ordinary skill in the art will understand, higher-order loop filters offer better noise cancellation, so loop filters of order 2 and more are used in critical applications.

Massively parallel acquisition scheme: This is a system which can at least substantially continuously acquire the signals of interest. It's ability to divide the Doppler, phase and code offset search space is only limited by the number of correlators and speed of the processors. In theory such a system could provide the interference modeling parameters to the present invention.

Navigation Data: GPS transmitters transmit a navigation data message which includes: a telemetry word, handover word, clock corrections, SV health/accuracy, ephemeris parameters, almanac, ionospheric model and coordinated universal time data.

Nominal Satellites: Satellites that are operating normally, e.g., within their design specifications.

Processing Channel: A processing channel of a GPS receiver provides the circuitry necessary to process the signal from a GPS transmitter (e.g., a satellite, or pseudolite). In general such a channel is where the acquisition and tracking functions take place.

Steady State: A computational state of an embodiment of a GPS receiver according to the present invention, wherein at least most and typically all the initial interfering signals (collectively denoted as "S") have been identified (i.e., "labeled"), and at least most and typically all the signals Q (interferers and non-interferers alike) have achieved "good lock" by the GPS receiver. Note that ("good lock" denotes the estimates of Doppler, phase and code offsets that are varying within an acceptable range (e.g., one set of experiments indicated phase must be within 12 degrees of truth, Doppler must be within 28 Hz of truth, and code offset must be within 1/50 of a chip).

SUMMARY OF THE INVENTION

The present invention is a method and system for reducing radio navigation interference so that a radio navigation receiver can more effectively detect and utilize legitimate wireless navigation signals as well as mitigate, cancel and/or remove interfering wireless signals.

The present invention is applicable to any radio-navigation system in which the interference to be removed can be predictively modeled (e.g., interference whose structure is known and can be simulated). In particular, the present invention is applicable with radio-navigation systems such as: United States GPS, and the proposed European Galileo navigation satellite system, to name a few.

It is an object of the invention to provide a technique that is independent of how a radio-navigation signal is transmitted. For example, the present invention can be applied to substantially any wireless frequency, e.g., radio frequencies: L1, L2, L5, E1, E2, M1, M2. In addition, the present invention can be applied to any Pseudo Random Noise (PRN) code, e.g., Coarse Acquisition (C/A) code, Precise P(Y) code, the new Military M-codes, and even the to-be-defined E-codes.

It is yet another object of the invention to have radio-navigation receivers equipped with an embodiment of the invention to thereby be resistant to the Near-Far interference problems and special cases thereof such as self-interference, jamming and spoofing.

It is yet another object of the present invention to be usable with and transparent to existing navigation augmentation and landing systems, e.g. WAAS, LAAS, and Inertial Navigation Systems (INS). Furthermore, should these augmentation and landing systems provide ranging information, the present invention can be an integral part of their architecture.

It is yet a further object to provide embodiments of the present invention that are fully compatible with all current Receiver Autonomous Integrity Monitoring (RAIM) techniques. RAIM provides timely warnings to GPS receiver users when the integrity of their PVT solution has been compromised. The various RAIM techniques are all based on some kind of self-consistency check among the available measurements. To be effective RAIM requires redundancy of information, i.e., 5 satellites to detect an anomaly and 6 satellites to identify and remove its faulty data from the navigation solution. Accordingly, the present invention adds an additional integrity monitoring technique for detecting and preventing spoofing and meaconing. Moreover, a wireless navigation receiver equipped with an embodiment of the invention only needs four satellites to detect a spoofer or meaconer, and only five satellites to remove their faulty data from a navigation solution.

It is also an object of the invention to provide a technology to make radio-navigation receivers more robust to interference. Embodiments of the invention can operate within a radio-navigation receiver as a signal processing technique. Additionally, embodiments of the present invention can be effectively used on analog or digital signals, and on RF or IF ranges. Thus, if predetermined and/or predictable structured interference is present in a wireless navigation signal, such interference can be removed and/or mitigated, and the resultant signal is passed to acquisition and tracking routines, as one skilled in the art will understand.

It is a further aspect of the present invention that it can be embodied substantially in software, firmware or other programmable techniques within a GPS receiver having appropriate hardware to enable the signal processing performed by the present invention. Moreover, it is also an aspect of the present invention that substantially all processing performed by the invention is embedded within the logic of one or more special purpose hardware components (e.g., chips, logic circuits, etc.) substantially without the need for programming such hardware components. Of course hybrid embodiments that are between a substantially programmed embodiment and a substantially hardware embodiment are also within the scope of the present invention.

Other objects and features of the present invention will be apparent from the following detailed description of the preferred embodiment and the accompanying figures herewith.

BRIEF DESCRIPTION OF THE DRAWINGS

The invention will be described in conjunction with the accompanying drawings, in which.

DETAILED DESCRIPTION OF THE PREFERRED EMBODIMENT

Interference Mitigation Technique

Referring to the Wireless Signal Modeling description in the Terms and Definitions section above, Sharf and Friedlander (Sharf L. L., B. Friedlander, "Matched Subspace Detectors," IEEE Trans Signal Proc SP-42:8, pp. 2146–2157, August 1994 incorporated fully herein by reference), showed that when the measurement noise variance is unknown, the uniformly most powerful (UMP) test for detecting contribution from H, while rejecting contributions from S is given by:

$$\tau(y) = \frac{y^T P_G y}{y^T P_S^\perp P_G^\perp P_S^\perp y} \tag{3}$$

where:

- $\tau(y)$ is the Generalized Likelihood Ratio Test (GLRT). That is, the test provided by $\tau(y)$ is for determining whether the signal H (i.e., the target signal) is part of the composite signal y. More specifically, the signal H is declared present in y if $\tau(y)$ exceeds some appropriately defined threshold.
- $P_S = S(S^T S)^{-1} S^T$ is the orthogonal projection operator matrix that takes an input and project it onto the space spanned by the columns of the matrix S.
- $P_S^{195} = I - P_S$ is the orthogonal projection operator matrix that takes an input and project it onto the space spanned by the columns of the matrix perpendicular to S.
- $G = P_S^{195} H = H - P_S H$ is a matrix whose columns span a subspace that contains those portions of H perpendicular to S. When searching for one signal, the matrix H reduces to a column vector, therefore G reduces to a column vector as well.
- $P_G = G(G^T G)^{-1} G^T$ is the orthogonal projection operator matrix that takes an input and project it onto the space spanned by the columns of the matrix G.
- $P_G^{195} = I - P_G$ is the orthogonal projection operator matrix that takes an input and projects it onto the space spanned by the columns of the matrix perpendicular to G.

Figure 3:
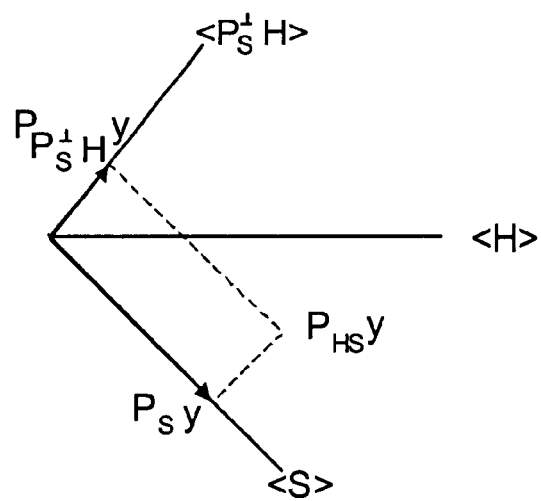
FIG. 3: Signal and interference subspaces, and various projections onto them.

Many of the projections are illustrated in FIG. 3. The above test using $\tau(y)$ has the additional benefit that the performance is invariant to non-negative scalings of y, i.e., multiplying y by a constant does not impact the test. Most RNSS receivers currently use a Matched Filter Detector (MFD) to perform the following computation:

$$z = H^T y \tag{4}$$

to determine if the signal H is present in y, i.e., the signal H is declared present in y if z exceeds some appropriately defined threshold. The present invention involves computing an un-normalized version of Equation 3 that has the form of Equation 4, which is suitable for use in today's RNSS receivers with only minor modifications (if any).

Note that there are normalization terms in both the denominator and numerator in Equation 3. Moreover, the denominator is only a normalization term and is ignored based on the following reasons. In a wireless receiver's tracking stage, (e.g., using FLL, and/or PLL) the ratio of the in-phase and quadrature signal components in the discriminator cancel any scale factor that results from the lack of normalization (e.g., such components included in component 428 of FIG. 4 described hereinbelow). Additionally, in acquisition, computing a properly adjusted detection threshold will also account for the lack of normalization.

The numerator term $y^T P_G y$ of Equation 3 can be decomposed as follows:

$$y^T P_G y = y^T G (G^T G)^{-1} G^T y \tag{5}$$

$$y^T P_G y = y^T G (G^T G)^{-\frac{1}{2}} (G^T G)^{-\frac{1}{2}} G^T y \tag{6}$$

$$y^T P_G y = ((G^T G)^{-\frac{1}{2}} G^T y)^T (G^T G)^{-\frac{1}{2}} G^T y \tag{7}$$

The final form of the numerator term in the above Equation 7 implies that a segment of y is operated on by the term $(G^T G)^{-\frac{1}{2}} G^T$. The result is then squared to compute $y^T P_G y$. Clearly, the term that is applied to the segment y is normalized, where the normalization term is $(G^T G)^{-\frac{1}{2}}$. To reiterate, the present invention modifies the computations provided in the Sharf and Friedlander, 1994 reference cited above, and performs an un-normalized operation on the measurement segment, y, by eliminating the term $(G^T G)^{-\frac{1}{2}}$ for the same reasoning that allows the denominator of Equation 3 to be ignored.

Accordingly, the detection test can now be written in a form similar to Equation 4. The resulting operation on y is given by:

$$z = G^T y \tag{7a}$$

Thus, the signal H is declared present in y if $G^T y$ exceeds some appropriately defined threshold.

Recall that $G = P_S^\perp H$ and therefore z from the above equation (7a) can be rewritten as follows:

$$z = H^T P_S^\perp y \tag{8}$$

Note that $P_S^\perp y$ is the orthogonal projection of y onto a space spanned by the columns of the matrix perpendicular to S as described above in the description of Equation 3.

By defining $\tilde{y}$ as:

$$\tilde{y} = P_S^\perp y \tag{9}$$

another form of a detection test similar to the conventional receiver test of Equation 4 is obtained as follows:

$$z = H_T \tilde{y} \tag{10}$$

Note that as per Equation 9, $\tilde{y}$ is the orthogonal projection of y onto the subspace orthogonal or perpendicular to the space spanned by the columns of S. Furthermore, the space defined by $\tilde{y}$ is oblique (i.e., non-orthogonal) to H. In other words, once $\tilde{y}$ has been calculated, the signal with interference S removed, it is simply passed to the standard acquisition and tracking stages.

An illustrative embodiment of the computations for determining S and $\tilde{y}$ are provided in the accompanying appendix hereinbelow.

Suboptimal solution of $\tilde{y}$

A suboptimal, but interesting variant of the above solution for $\tilde{y}$ is to process the S matrix serially, one vector at a time, i.e.:

$$y_1 = y - s_1(s_1^T s_1)(s_1^T y) \qquad (11)$$

$$y_2 = y_1 - s_2(s_2^T s_2)(s_2^T y_1) \qquad (12)$$

$$\tilde{y} = y_{N-1} - s_N(s_N^T s_N)(s_N^T y_{N-1}) \qquad (13)$$

This method is sub-optimal because the cross correlation between the various $s_i$ is lost.

CDMA Principles

In spread spectrum techniques, like CDMA, each user is assigned a time varying code that is used to spread each bit in the digital data stream to occupy the entire spectral band allocated to the Multiple Access System (MAS). The different users in such a system are distinguished by the unique spreading codes assigned to each user. Therefore, all users simultaneously use all of the bandwidth when wirelessly communicating.

Each user in a CDMA system uses a unique noise (pseudorandom PN) code to spread the bits. Upon reception, each user's coded signal is compressed using a matched filter that is matched to that user's code to extract the desired bit sequence.

Figure 1:
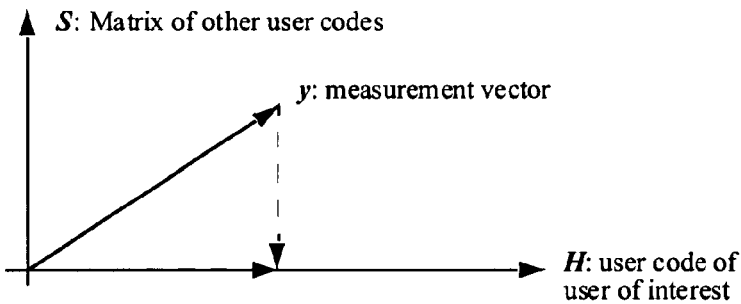
FIG. 1 is a geometric interpretation of matched filtering. Matched filtering is the method used in most commercial GPS receivers produced today. Mathematically the matched filter is $H^T y$.

Ideally the user codes are designed to be perfectly orthogonal when the codes are aligned. Such an alignment of the codes is achieved when there is perfect synchronization. In such a case, the matched filtering operation, which is based on an orthogonal projection, completely nulls out all users except the user of interest, as one skilled in the art will understand. This is illustrated in FIG. 1, where the user code of interest is the vector H that is shown to be orthogonal to S, the matrix of all the other user codes. As shown in this figure, the orthogonal projections of y (a measurement vector of the composite signal) onto H using a matched filter results in perfect cancellation of all contributions from S.

GPS Interference

However for GPS, C/A and P(Y) Codes are not perfectly orthogonal. In particular, the C/A-code length is only 1,023 chips. So the cross-correlation properties can be poor under certain circumstances (as discussed in Parkinson, B. W., Spilker, J. J., Global Positioning System: Theory & Applications, vol-1 & 2, American Institute of Aeronautics and Astronautics, 1996, incorporated herein by reference). Alternatively, the P(Y) code with $6.1871 \times 10^{12}$ chips is virtually orthogonal for all offsets. However, the problem here is that reception of this data would literally take a week and the required integration time would be computationally staggering. Accordingly, all P(Y) code receivers use significantly shorter lengths, which again compromises its cross correlation properties.

Figure 2:
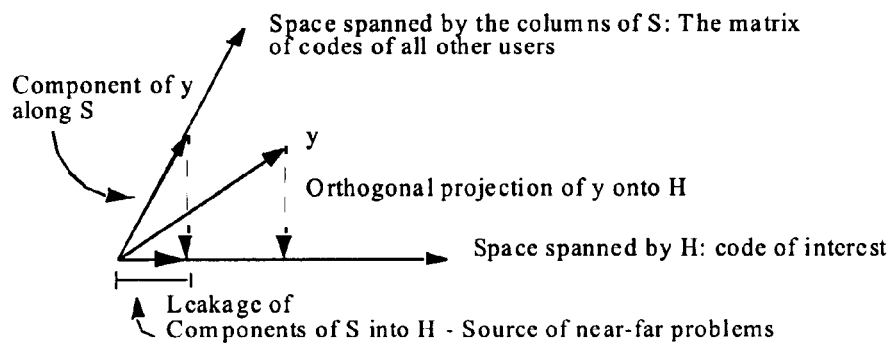
FIG. 2 illustrates the source of interference when using orthogonal projections on non-orthogonal signals.

The non-orthogonality of commingled signals is further exacerbated by the fact that when a receiver that is searching for its time (by performing a correlation operation) relative to the GPS satellites, the communication is asynchronous. Therefore the GPS codes will never be perfectly aligned in time, as one skilled in the art will understand. This adds to the non-orthogonality of the codes. Thus, if a matched filter is used to decode a desired GPS signal from a satellite or PL, there will be leakage of signals from other satellite or PL signals as shown in FIG. 2.

The signal leakage from other satellites or PLs becomes interference noise against which the desired target signal must be detected. As the interference noise-level increases, the performance of the receiver detectors degrade. As discussed in the Terms and Definitions section hereinabove, this effect is commonly referred to as the "near-far" effect.

The present invention may be implemented as a signal processing technique in a radio-navigation receiver. Radio-navigation receivers vary widely in capabilities and design but embodiments of the present invention can be included therein in much the same way regardless of the wireless navigation receiver design. For discussion purposes, FIG. 4 is indicative of many of today's radio-navigation receivers.

Figure 4:
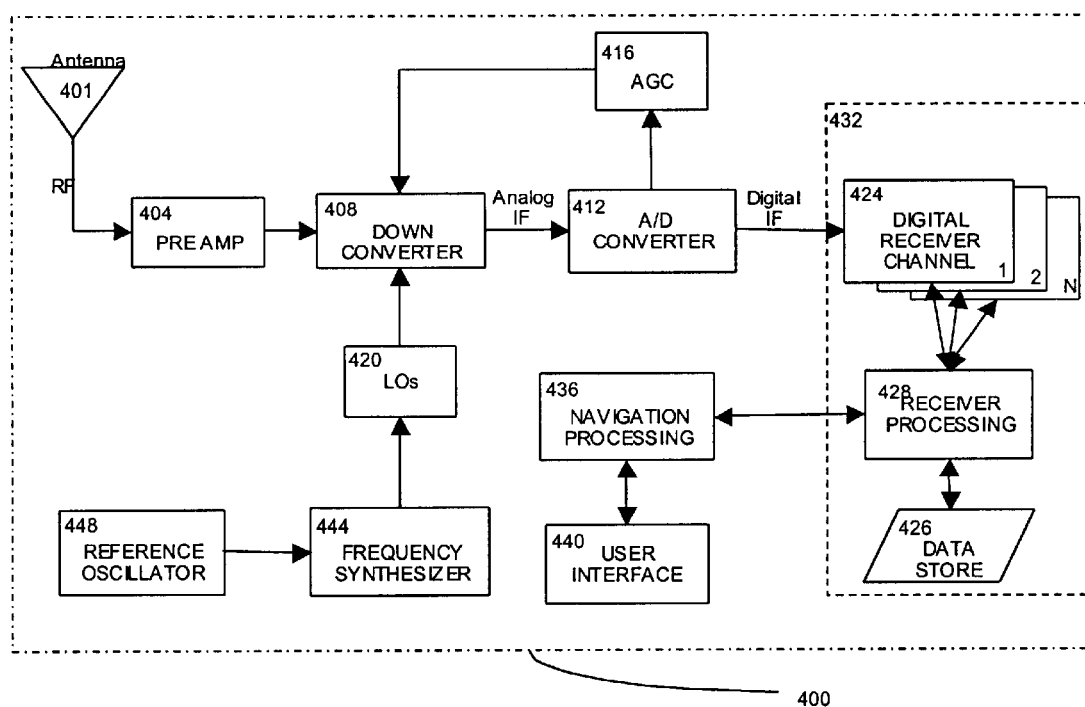
FIG. 4 is a generic digital GPS Block diagram.

FIG. 4 is a diagram of a generic GPS receiver 400. Note that specific receiver design is usually proprietary. Thus, variations on the diagram of FIG. 4 can include: (i) a GPS receiver that is entirely analog, (ii) a GPS receiver wherein processing is performed in the RF range, (iii) a different placement of one or more of the pre amp 404, the A/D converter 412, the AGC 416, etc. A high level description of the components of the GPS receiver 400 and their signal processing relationship to one another will now be provided.

The GPS radio-frequency signals of all space vehicles (SVs) in view are received by the antenna 401. Typically the antenna 401 is right-hand circularly polarized with nearly hemispherical gain coverage. The RF signals are amplified by a low-noise preamplifier 404. This amplifier is by far the major contributor of noise to the receiver 400. In some implementations a passive bandpass filter is located between the antenna 401 and the preamp 404 to remove out-of-band RF interference. The amplified and signal-conditioned RF signals are then down converted to IF, via the down converter 408, using signal mixing frequencies from local oscillators 420 (LOs), as one of ordinary skill in the art will understand. The input frequencies to the LOs 420 are derived from the reference oscillator 448 via the frequency synthesizer 444 based on the frequency plan of the particular receiver design. There may be one LO 420 per down converter 408. The upper sidebands and leak-through signals are passed through a postmixer bandpass filter (not shown) of the down converter 408 to complete the down conversion process. The analog to digitalconverter (ADC) 412 and automatic gain controller (AGC) 416 operate at IF. The digital IF signal is passed from the A/D converter 412 to the N digital receiver channels 424. Using the output from A/D converter 412 each receiver channel 424 performs the acquisition functions and the code and carrier tracking loops (i.e., delay locked loop (DLL), frequency locked loop (FLL), and phase locked loop (PLL)) for a single SV or PL. Or, depending on the receiver, the digital receiver channels primarily perform the correlation operations and work with the receiver processing component 428 for implementing loop discriminators and filters, data demodulation, meters, phase lock loops, and so forth. Additionally, the receiver processing component 428 may store various types of data in, e.g., a data store 426 for each channel 424 which is tracking a signal. This data store is shared amongst all the channels 424. After the data obtained from the GPS signals has been demodulated it is passed to the navigation processing component 436 and the position, velocity and time (PVT) solution is calculated, and displayed 440.

Within a receiver 400, an embodiment of the present invention may be incorporated into the receiver channel(s) 424 and the receiver processing component 428. For a digital implementation, however, the present invention requires that the dynamic range of the ADC 412 be sufficient to capture all the signals of interest, including the interference. Similarly components 424 and 428 may need to be modified or replaced depending on the dynamic range of the ADC 412 and the requirements of the invention (e.g., the data store 426 and additional processing capabilities).

The interference processing channel 432 (FIG. 4) identifies the components within which the present invention is, in at least one embodiment, incorporated. For each interference mitigation performed by the present invention, the data store 426 stores the following modeling parameters: (a) a pseudo-random number, (b) code offset data obtained from the delayed lock loops (DLL), (c) phase and Doppler data obtained from the frequency locked loop (FLL) and/or the phase locked loop (PLL), and (d) at least one bit that can be toggled between being set and being unset depending on whether the its corresponding GPS signal has been labeled an interferer or not.

When near-far interference effects occur, the above identified parameters (a) through (d) are usually sufficient to model the interference of each dominant interfering GPS signal. In a more demanding situation (e.g., relatively lower power interferers), higher order DLLs, FLLs and PLLs (as described in the Terms and Definitions section above) may be used to also provide code offset rate and phase rate and Doppler rate to more accurately model the interference signals when provided with the output of the A/D converter 412. Note that it is within the scope of the present invention to obtain such parameters by other techniques as well, e.g., a massively parallel acquisition scheme (as also described in the Terms and Definitions section above) may provide the required modeling parameters at the fidelity necessary.

Identification of Interfering Signals

Figure 5:
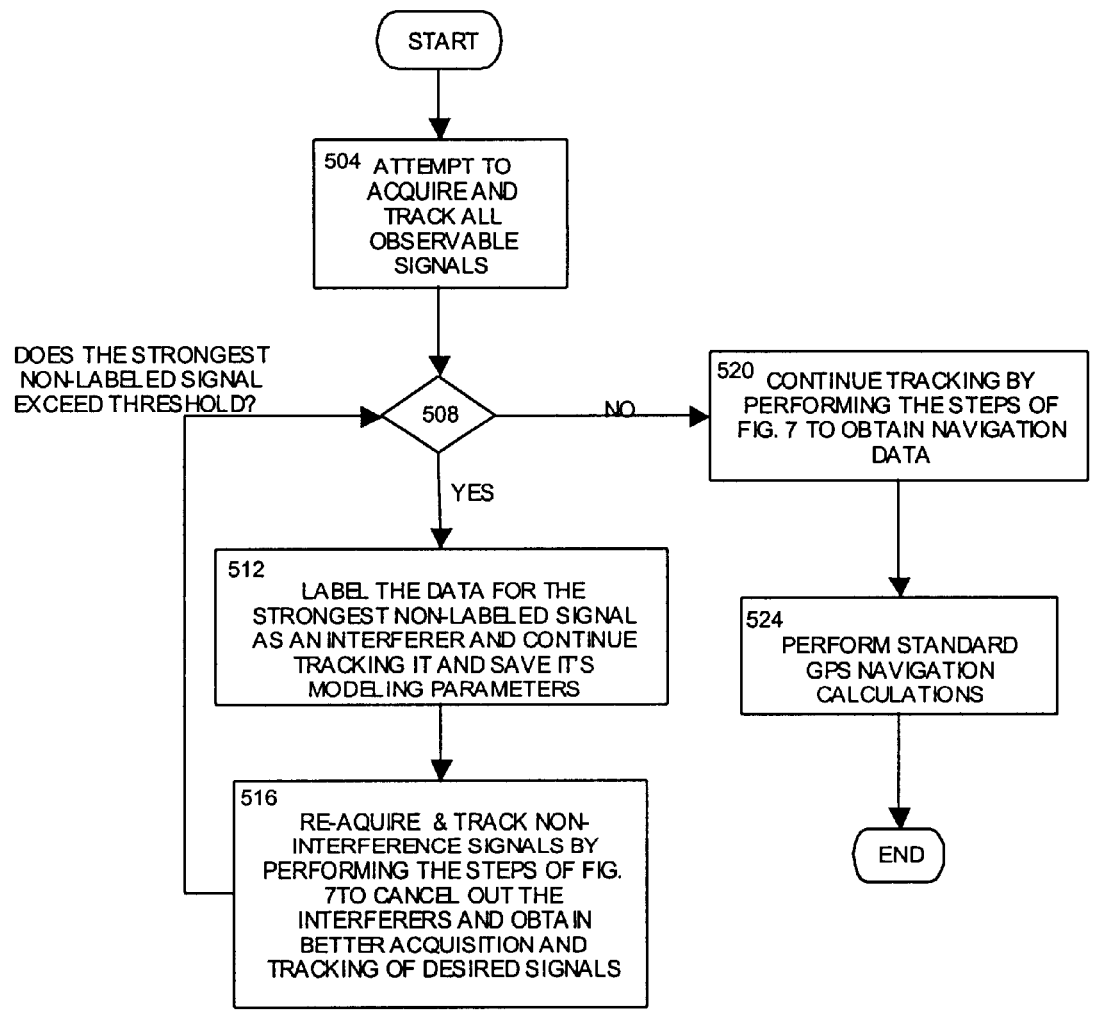
FIG. 5 is an iterative procedure to determine interferers.

The invention predictively models identified interfering signals. In GPS NF situations, the interference includes one or more SV's (and/or PL's) pseudo-random noise code (PRN). Such interference can be predictively modeled, since all GPS signals can be predictively modeled (in that the structure of such signals is well known and accordingly can be substantially reconstructed from such signal modeling parameters as identified hereinabove). In some situations, such signals may be known a-priori, in which case the standard baseline receiver 400 architecture of FIG. 4 can acquire and track such interferers normally (i.e., as any other GPS signal), and then the procedure of FIG. 7 (described hereinbelow) can be used to acquire and track each desired nominal (i.e., non-interference) signal by canceling out the a-priori interferers. If the interfering PRN signals are not known a-priori, the procedures of FIG. 5 and FIG. 6 (also described hereinbelow) have been demonstrated to cancel the interferers in GPS:

In extreme cases of NF interference, the signal power levels (from distinct GPS signaling sources) are dramatically different from each other, e.g., one PL's signal, call it PL1, can be 20 dBW above the nominal satellites (i.e., GPS constellation satellites operating normally) and another PL's signal, call it PL2, can be 20 dBW above that of PL1. In this situation, the interferers must be iteratively identified from highest power to lowest as FIG. 5 illustrates. Note that the procedure of FIG. 5, in general, takes more elapsed time to accomplish than the procedure illustrated in FIG. 6 but tends to be more robust.

A description of the steps of FIG. 5 follows. Note, these refer to the components of FIG. 4; however, it is to be understood that the A/D converter 412 and the components of the interference processing channel 432 must include the requisite functionality to perform these steps (as well as the steps of FIG. 7):

Step 504: The receiver 400 attempts to acquire and track all observable GPS signals. This is primarily done using standard GPS acquisition and tracking functions components 424 and 428.

Step 508: Once the signals that can be tracked have achieved 'good' lock, i.e., the estimates of Doppler, phase and offsets are varying within an acceptable range (e.g., one set of experiments indicated phase must be within 12 degrees of truth, Doppler must be within 28 Hz of truth, and code offset must be within 1/50 of a chip), the most powerful signal is compared to a threshold criteria. This threshold criteria may be as simple as identifying the strongest M of N signals as presumed interferers, or the threshold criteria could be based on design specifications such as those of USCG, "Navstar GPS Space Segment 1 Navigation User Interfaces", ICD-GPS-200C incorporated herein by reference (e.g., a predetermined dBW value, such as 10 dBW, above the user minimum received power using a 3-dB gain linearly polarized antenna; note that the specified user minimum received power for L1 C/A-Code is −160 dBW, for L1 P(Y)-Code is −163 dBW and for L2 P(Y)-Code or C/A-Code is −166 dBW). This threshold criteria, in some embodiments, may be defined as a value corresponding to a signal to noise ratio (SNR), or signal to carrier ratio (SCR), or carrier to noise ratio (CNR), relative amplitude, or some combination of such values (e.g., a weighted sum thereof or a series of threshold tests wherein each test uses at least one of these ratios). Note that the Parkinson, B. W., Spilker, J. J., 1996 reference cited hereinabove (and incorporated fully herein by reference) details such a method for combining such values.

Step 512: Any signal exceeding (or violating) this threshold criteria is labeled as an interferer (i.e., the data representing such a signal is accordingly labeled such as by toggling the bit field (d) of the modeling parameters described hereinabove). This labeled interferer continues to be tracked and it's current Doppler, phase offset and code offset is saved in the data store 426.

Step 516: All signals that have not been as yet labeled as interferers are then re-acquired and tracked by invoking FIG. 7 to cancel out all labeled interferers to obtain better acquisition and tracking of the desired signals. Control then passes back to step 508.

Step 520: After all the interfering signals have been labeled, and all the non-interfering signals have achieved good lock, the receiver enters what will be denoted wherein as a 'steady state'. Tracking continues for all channels by, again, performing the procedure described in FIG. 7 and the navigation data is demodulated.

Step 524: Once sufficient navigation data has been demodulated, the desired navigation solution (e.g., PVT) can be computed via the navigation processing component 436.

Figure 6:
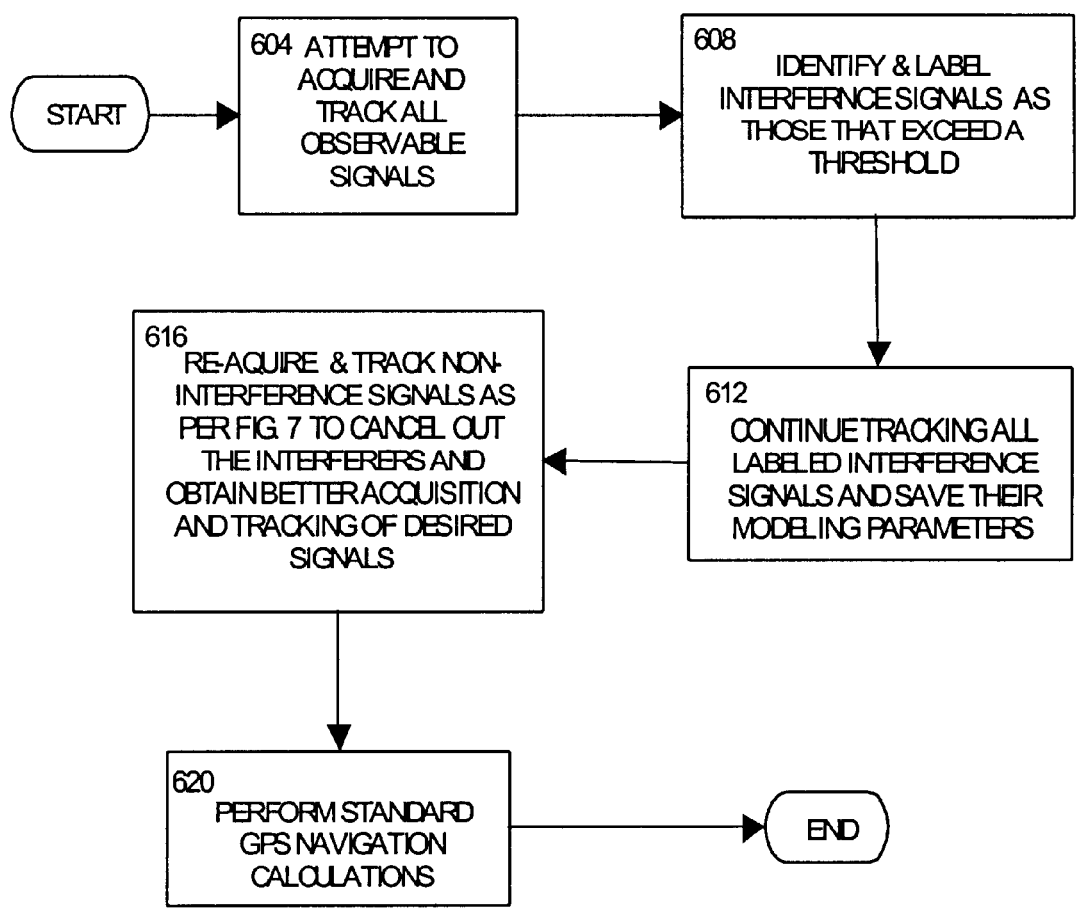
FIG. 6 is a procedure to determine interferers all at once.

FIG. 6 is similar to FIG. 5 except the decision identify (i.e., label) all initial interferers is done at one time, whereas FIG. 5 demonstrated an iterative scheme that identified interferers from highest power downwards. This procedure has been shown to be useful in cases where all the interfering GPS signals are roughly equal power.

Step 604: The receiver attempts to acquire and track all observable GPS signals. This is primarily done using the standard GPS acquisition and tracking functions components 424 and 428.

Step 608: Once the signals that can be tracked have achieved 'good' lock, i.e., the estimates of Doppler, phase and offsets are varying within an acceptable range (e.g., one set of experiments indicated phase must be within 12 degrees of truth, Doppler must be within 28 Hz of truth, and code offset must be within 1/50 of a chip), the all the signals are compared to a threshold criteria. This threshold criteria may be as simple as identifying the strongest M of N signals as presumed interferers, or it could be based on design specifications such as those, of ICD-GPS-200C identified hereinabove (e.g., 10 dBW above the user minimum received power using a 3-dB gain linearly polarized antenna. The specified user minimum received power is L1 C/A-Code is −160 dBW, L1 P(Y)-Code is −163 dBW and L2 P(Y)-Code or C/A-Code is −166 dBW). This threshold criteria, in some embodiments, may be defined as a value corresponding to a signal to noise ratio (SNR), or signal to carrier ratio (SCR), or carrier to noise ratio (CNR) or some combination of such values (as in step 508 above).

Figure 7:
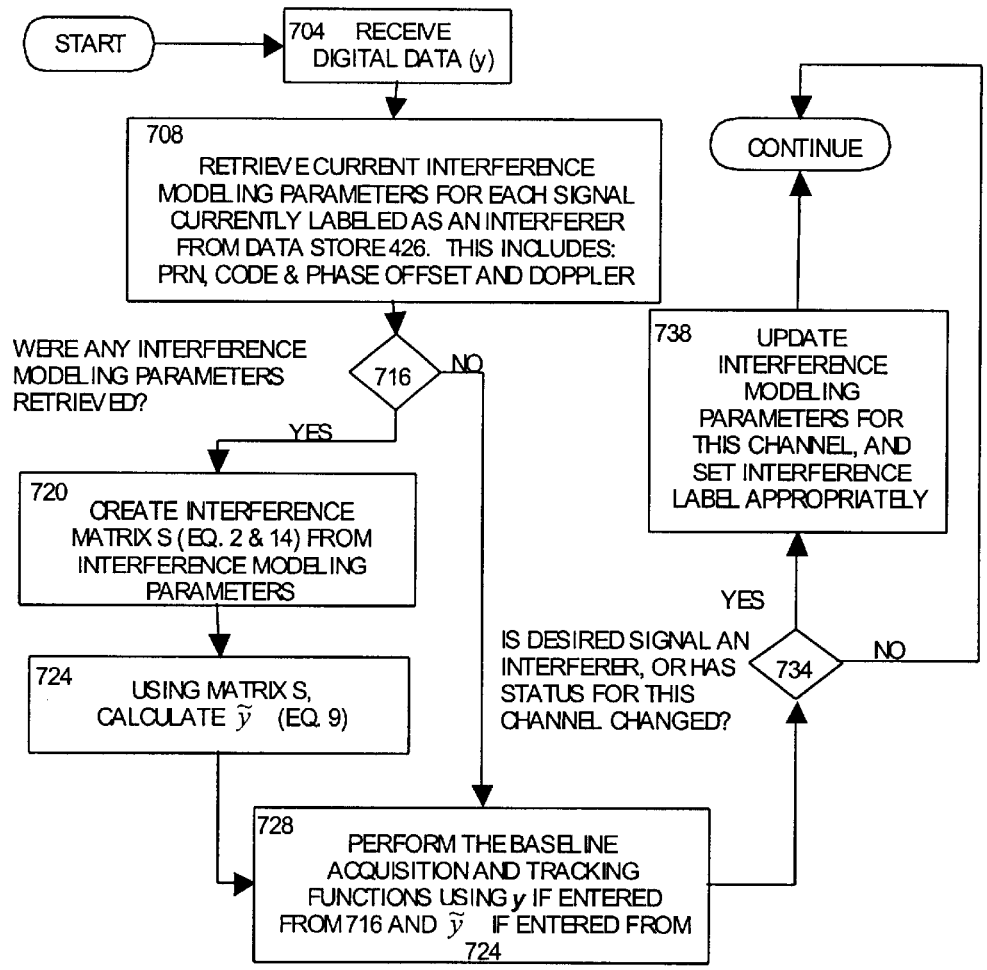
FIG. 7 shows a flowchart performed by a single processing channel in an interference resistant GPS receiver in steady state operation. This processing channel is included in a digital receiver channel 424 and a portion of the receiver processing component 428 in FIG. 4.

Step 612: Any signal exceeding this threshold is labeled as an interferer. These labeled interferers continue to be tracked and their current Doppler, phase offset and code offset are saved in the data store 426.Step 616:

All signals not labeled as interferers are then re-acquired and tracked by invoking FIG. 7 to cancel out all labeled interferers and thereby to obtain better acquisition and tracking of the desired signals and the navigation data is demodulated.

Step 620: Once sufficient navigation data has be demodulated the navigation solution can be computed 436.

FIG. 7 shows a high level process diagram of the operation of the signal interference mitigation method and apparatus of the present invention, during steady state. Steady state is where the initial interferers have been identified as described in the Terms and Definition section above. The steps of FIG. 7 may be described for a GPS embodiment as follows:

Step 704: Digital data y (as described in Interference Mitigation Technique section above) is provided to the interference processing channel 432. As mentioned earlier this data could be IF or RF. In FIG. 4 the data y is received by the antenna 401 and then passed to the pre-amp 404 for amplification. Assuming the GPS radio-navigation signal y is then down converted, via down converter 408, to an intermediate frequency (IF) and passed through to the A/D converter 412 for digitally sampling. The number of bits in the A/D converter 412 must be sufficient to capture all signals of interest, including the interference signals. Accordingly, for an embodiment of the receiver 400 to capture, e.g., 7 to 8 signals differing by +33 dB, the number of bits in a linear A/D converter 412 is at least 8 bits. Note that when near-far interference effects occur, the power of at least one interfering signal is significantly higher than any non-interfering (nominal) GPS signals, thus requiring the A/D converter 412 to utilize such a range of bits to be able to acquire and track the weaker signals. A GPS receiver needs at least 1 bit to acquire and track a GPS signal, as one of ordinary skill in the art will understand. After passing through the ADC 412, the IF signal is fed to all processing channels.

Step 708: Retrieve the current interference modeling parameters from the data store 426 having interference modeling parameters for all the interference processing channels 432. Note, there may be no current interferers, or there may be one or multiple interferers. All the interference modeling parameters (for signals that have labeled as interferers) that exist in the data store 426 are retrieved.

Step 716: If any interference modeling parameters are retrieved in step 708, then control is passed to 720, else control goes to 728.

Step 720: The interference modeling parameters are used to create an in-phase interference reference signals which have the form:

$$s_{i_{CA}}(\omega t) = [G_i(t)]\sin(\omega t)$$

where:

$G_i(t)$ is the Coarse Acquisition (C/A) code's $i^{th}$ chip at time t (used in the Standard Positioning System (SPS))

$\omega$ is the carrier frequency.

Once the interference signal of each interference PRN is created, the interference signals are assembled into a matrix, S, as in equation (2) of the Wireless Signal Model description in the Terms and Definitions section hereinabove. Note, the desired signal (for which interference is being removed) will not be part of S even if it is identified as an interferer. This rule even applies to multipath, meaconing and spoofing, see section on Meaconing and Spoofing.

Step 724: Once S has been calculated, $\tilde{y}$ is determined as per equation (9), thereby removing the interference characterized by the interference modeling parameters.

Step 728: Perform conventional acquisition and tracking functions. If this step was entered from step 724 use $\tilde{y}$ (for computing Equation 10) and if this step was entered from 716 use y (for computing Equation 4).

Step 734: The desired signal is compared to the interference threshold criteria that was used in 508 or 608. If the classification of the desired signal is still labeled as an interferer (based on information from the data store 426) or it has changed from being an interferer to a non-interferer control will pass to step 738, else control of the interference processing channel 432 passes to the next step of FIG. 5 (or FIG. 6) following the current activation of FIG. 7.

Applicants have observed that a potential interfering signal should exceed (or violate) the threshold criteria for at least twenty times in a row before its classification should be changed and therefore labeled an interferer (or unlabeled thereby designating that it is not an interferer). This prevents mistakenly changing its classification due to a noise spike or a navigation bit flip.

Step 738: Update the desired signal's (this channel's) current interference modeling parameters to the data store 426 of all the interference processing channels. Note such updates include: (i) removing a labeling of the desired signal as an interferer if this signal remains below the threshold criteria consistently, and (ii) labeling the desired signal as an interferer if this signal was consistently above the threshold criteria or just updating the current signals interference modeling parameters.

GPS Example 1

Figure 8:
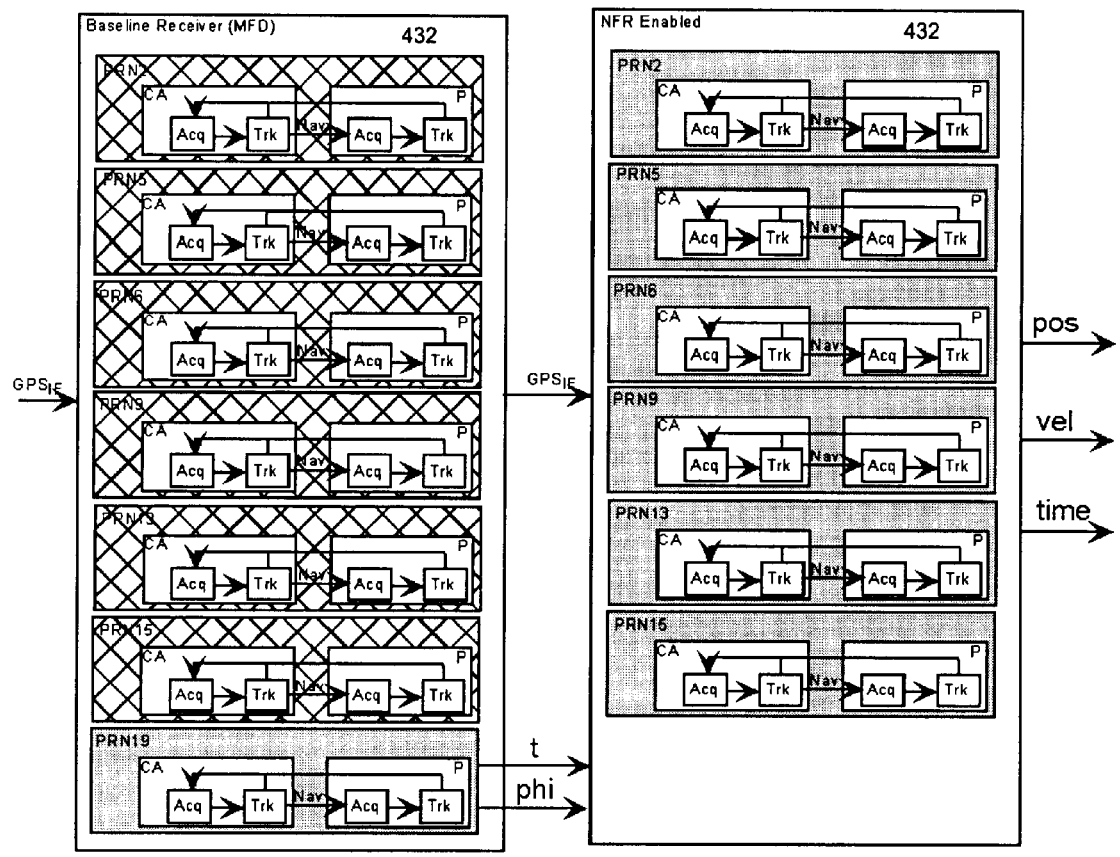
FIG. 8 is an overview of one embodiment of an interference resistant GPS receiver according to the present invention. In this figure, processing channel PRN19 is >20 dB stronger than the other 'nominal' processing channels shown.

FIG. 8 is presented to further illustrate the procedure of the present invention for identifying and mitigating interfering GPS signals. In particular FIG. 8 provides further clarification of FIGS. 5 and 6. FIG. 8. illustrates seven receiver channels 432 at two points in time ($t_1$ and $t_2$) in a GPS receiver 400 equipped with the present invention. For FIG. 8 assume that the "in-view" satellites are identified as PRN2, PRN5, PRN6, PRN9, PRN13, PRN15, and PRN19, and, that the corresponding processing within the interference processing channel 432 for the signal from each of these satellites is correspondingly identified (for convenience) by a block labeled by the satellite whose signal is being processed. In particular, each of the blocks identified by the satellite labels represents those tasks performed by a combination of the receiver processing component 428 together with a different one of the receiver channels 424 in combination with its corresponding data store 426. Assume all the satellite's PRNs identified above have a nominal power of −160 dBW to −158 dBW except for PRN19 which is a +30 dBW above nominal (i.e., PRN19 is the only interferer in this example). Further assume a user has set the threshold criteria to be: 15 dBW above nominal or the two strongest signals. Note, only one of these threshold conditions is needed. However, both conditions are presented for illustration.

The left hand portion of FIG. 8 illustrates that a receiver 400 (without use of the present invention) would only be able to successfully acquire and track PRN19, the hashed processing channels indicate they cannot successfully acquire and track their assigned GPS signal. Referring back to FIGS. 5 and 6, this scenario (of being able to only track one of the satellites) corresponds to a scenario that can occur at steps 504 and 604. A receiver equipped with the present invention takes the valid tracking information from PRN19, i.e., the time, phase and Doppler and removes PRN19's signal from the incoming GPS IF data stream. By definition PRN19 is predictable interference and in this example exceeds the threshold (as determined in steps 508 and 608).

The right hand portion of FIG. 8 illustrates the effect of the present invention at a later time, $t_2$. PRN19 is still being tracked using the unmodified incoming GPS IF data stream (e.g., steps 512 and 612) and its ranging information is still be available (if valid) for the PVT solution. However, once the PRN19's interference is removed (e.g., steps 516 and 616), a receiver 400 equipped with the present invention is able, in parallel, to acquire and track the nominal satellites, i.e., PRN2, PRN5, PRN6, PRN9, PRN13, and PRN15. At this point, the PVT solution is calculated normally (e.g., steps 524 and 620). As can be seen, a receiver 400 equipped with the present invention is able to calculate the PVT solution where receivers 400 not utilizing the present invention are only able to acquire and track PRN 19. Furthermore, it can be seen that for the case where there is a single interference signal, FIG. 5 is equivalent to FIG. 6.

GPS Example 2

In this example assume that the "in-view" satellites are PRN2, PRN5, PRN6, PRN9, PRN13, PRN15, and PRN19. All PRNs have a nominal power of −160 dBW to −158 dBW except for PRN 15 and PRN19 which are +25 and +30 dBW above nominal respectively (i.e., PRN15 and PRN19 are the interferers in this example). For illustration, assume a user has set the threshold criteria to be 15 dBW above the nominal, or the two strongest signals.

With reference to the steps of FIG. 5, assume a receiver 400 equipped with the present invention attempts . to acquire and track all the observable signals (e.g., step 504). The receiver 400 would only be able to successfully acquire and track PRN15 and PRN19. Based on the threshold criteria (e.g., step 508) PRN19 would be labeled as an interferer and it would continue to be tracked (e.g., step 512) and the modeling parameters for this interferer would be stored in the data store 426 every time the tracking loops are performed. Now all the remaining non-labeled signals PRN2, PRN5, PRN6, PRN9, PRN13, and PRN15 would be re-acquired and tracked by performing the steps of FIG. 7 (at step 516). The rank of the resulting matrix S is 1 at this point.

Subsequently, step 508 is again performed. Based on the threshold criteria (used at step 508) PRN15 is now also labeled as an interferer and PRN15 is continued to be tracked (at step 512) and the modeling parameters for this interferer are stored in the data store 426 every time the tracking loops iterate. Now all the remaining non-labeled signals PRN2, PRN5, PRN6, PRN9, and PRN13 are again re-acquired and tracked by performing the. steps of FIG. 7 (at step 516 ). The resulting rank of the matrix S (determnined in FIG. 7) is 2 at this point for PRNs 2, 5, 6, 9, 13 and rank 1 for PRN15.

After the four or more of the GPS signals have been successfully tracked, and their navigation demodulated (this includes PRN15 and PRN19 in this example), the PVT calculations are performed (at step 520). As more processing channels demodulate their resulting navigation data such additional information is used to improve the PVT solution, as one of ordinary skill in the art will understand.

With referenceto the steps of FIG. 6, assume a receiver 400 equipped with the invention attempts to acquire and track all the observable GPS signals (at step 604) as identified in the description of the steps of FIG. 5 immediately above. The receiver 400 would only be able to successfully acquire and track PRN15 and PRN19. Based on the threshold criteria (at step 608) both of these signals would be labeled as interferers and they would continue to be tracked (at step 612) and the modeling parameters for these two interferers would be stored in the data store 426 every time tracking loops are performed. Now all the remaining non-interferers PRN2, PRN5, PRN6, PRN9, PRN13 can be re-acquired and tracked by invoking FIG. 7 (at step 616). After four or more of the GPS signals have successfully been tracked, and their navigation data demodulated, (this includes PRN 15 and PRN 19 in this example), the PVT calculations would be performed (at step 620). As more processing channels demodulate their corresponding navigation data, the resulting information is used to improve the PVT solution.

Application to GPS Precise Positioning System

The present invention is directly applicable to the GPS Precise Positioning System (PPS) as well as the Standard Positioning System (SPS) using the CA code discussed above. The GPS signal structure for the L1 frequency looks like:

$$L1_i(\omega t) = A[P_i(t) \oplus D_i(t)]\cos(\omega t) + \sqrt{2}A[G_i(t) \oplus D_i(t)]\sin(\omega t) \quad (15)$$

where:

A is the amplitude $P_i(t)$ is the Precise [P(Y)] code's $i^{th}$ chip at time t [used in PPS]

$D_i(t)$ is the navigation data's $i_{th}$ bit at time t $G_i(t)$ is the Coarse Acquisition [C/A] code's $i^{th}$ chip at time t [used in SPS]

$\omega$ is the carrier frequency

As can be seen, the C/A code is 3 dB stronger than the P(Y) code. If a receiver 400 is sampling the signal at a rate sufficient for CA code, then the P(Y) will appear as noise 3 dB less than the original interference signal. As one of ordinary skill in the art understands long coherent integration can mitigate the effect of the strong P(Y) code noise.

If a PPS GPS receiver is being used, the sampling rate will be 10 times higher than the sampling rate needed for the CA code. Most GPS receivers acquire and track the CA code and use the information in the navigation message to 'jump' into the P(Y) code. As explained above, a GPS receiver equipped with the present invention acquires the CA code. Once the receiver channel is tracking an interfering signal, the receiver transitions into the P(Y) code, as one of ordinary skill in the GPS field understands.

Figure 9:
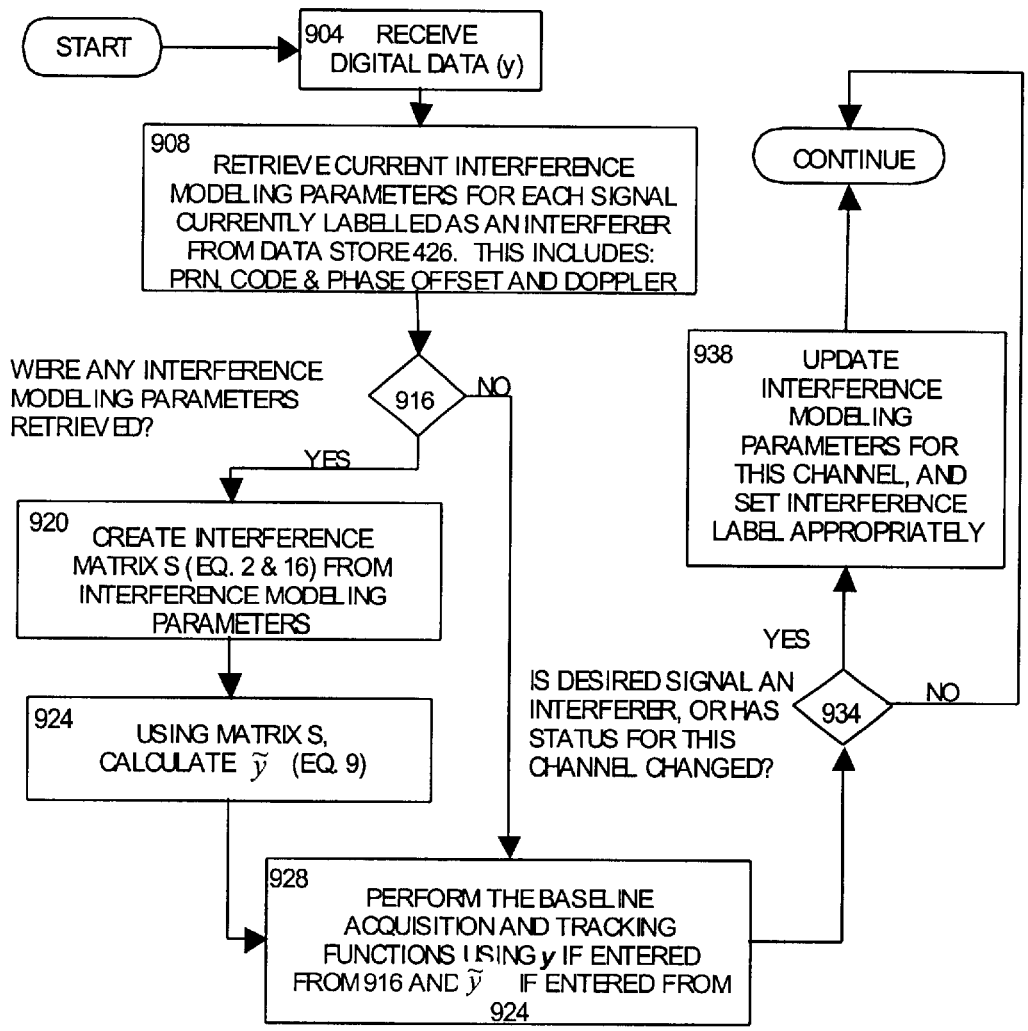
FIG. 9 illustrates an embodiment of the interference resistant processing channel in which both CA and P(Y) codes are processed.

Because of the higher sampling rates, the noise/interference from the P(Y) code can now be removed. The interference associated with the P(Y) code can be removed in exactly the same way as was done for the CA code. This process is illustrated in the flowchart of FIG. 9 whose steps will now be described:

Step 904: Digital data y (as described in Interference Mitigation Technique section above) is provided to the interference processing channel 432. As mentioned earlier this data could be IF or RF. In FIG. 4, the data is received by the antenna 401 and then passed to the preamp 404 for amplification. Assume the GPS radio-navigation signal y is then down converted, via down converter 408, to an intermediate frequency (IF) and passed through to the A/D converter 412 for digitally sampling. The number of bits in the A/D converter 412 must be sufficient to capture all signals of interest, including the interference signals. Accordingly, for an embodiment of the receiver 400 to capture, e.g., 7 to 8 signals differing by +33 dB, the number of bits in a linear A/D converter 412 is at least 8 bits. Note that when near-far interference effects occur, the power of at least one interfering signal is significantly higher than any non-interfering (nominal) GPS signals, thus requiring the A/D converter 412 to utilize such a range of bits to be able to acquire and track the weaker signals. A GPS receiver 400 needs at least 1 bit to acquire and track a GPS signal, as one of ordinary skill in the art will understand. After passing through the ADC 412, the IF signal is fed to all processing channels.

Step 908: Retrieve the current interference modeling parameters from the data store 426 having interference modeling parameters for all the interference processing channels 432. Note, there may be no current interferers, or there may be one or multiple interferers. All the interference modeling parameters (for signals that have labeled as interferers) that exist in the data store 426 are retrieved.

Step 916: If any interference modeling parameters are retrieved in step 908, then control is passed to 920, else control will go to 928.

Step 920: Once the P(Y) code and the CA code tracking loops are both locked onto the signal. The interference to both components can be removed at the same time. The interference modeling parameters are used to create in-phase reference signals which have the form:

$$s_i(\omega t) = [P_i(t)]\cos(\omega t) + [G_i(t)]\sin(\omega t) \quad (16)$$

where the variables have the same meanings as described in step 720.

Once the interference signal of each interference PRN is created, they are assembled into a matrix, S, as in equation (2) (of the Wireless Signal Model description in the Terms and Definitions section hereinabove). Note, the desired signal will not be part of S even if it is identified as an interferer. This rule even applies to Multipath, meaconing and spoofing, see section on Meaconing and Spoofing.

Step 924: Once S has been calculated, y is determined as per equation (9), thereby removing the interference characterized by the interference modeling parameters.

Step 928: Perform conventional acquisition and tracking functions. If this step was entered from step 924 use y and if this step was entered from 916 use y.

Step 934: The signal is once again compared to the interference threshold. If the signals classification is still labeled as an interferer or it has changed from being an interferer to a non-interferer control will pass to step 938 else the control interference processing channel and baseline receiver function will continue. As mentioned above, in step 734, applicants have observed that a potential interfering signal should exceed (or violate) the threshold criteria for at least twenty times in a row before its classification should be changed and therefore labeled an interferer (or unlabeled thereby designating that it is not an interferer). This prevents mistakenly changing its classification due to a noise spike or a navigation bit flip.

Step 938: Update the desired signal's (this channel's) current interference modeling parameters to the data store 426 of all the interference processing channels. Note such updates include: (i) removing a labeling of the desired signal as an interferer if this signal remains below the threshold criteria consistently, (ii) labeling the desired signal as an interferer if this signal was consistently above the threshold criteria or just updating the current signals interference modeling parameters.

Application to Anti-Jamming in GPS

If GPS receivers are in a jamming interference environment the present invention provides interference resistance that can be used to eliminate a spoofer. The jamming PRN is simply acquired, tracked, and then eliminate it from the composite signal by the present invention.

Mitigation of Self Interference in GPS

Self interference is when a GPS transmitter and receiver are substantially collocated (e.g., as described in the Terms and Definition section). The application of the present invention to mitigate self-interference is actually more accurate than in the standard interference resistant GPS receiver. The reason for this is rather than estimating the interfering GPS signal's phase, offset and Doppler from the tracking loops, this data is supplied exactly by the GPS transmitter to a GPS receiver enhanced according to the present invention.

Application to WAAS and LAAS Landing Systems

Precision navigation and landing systems require reliable and highly accurate position, velocity and time (PVT) information not achievable by standalone GPS. To meet these requirements additional GPS transmitters are needed to improve the accuracy. These additional transmitters can be additional satellites as specified in the Wide Area Augmentation System (WAAS) or PLs based on the ground as specified in the Local Area Augmentation System (LAAS), or on board ships, or even Unmanned Aerial Vehicles (UAV) loitering in the air above an area of interest. WAAS and LAAS can transmit either GPS correction data (i.e., GPS differential data) or provide additional ranging information. For such applications, PLs can be used for Carrier-Phase Differential GPS navigation, resulting in a potential range precision of about I mm (as recited in Elrod, B. D., Van Dierendonck, A. J., "Pseudolites", Ch 2. pg 51 in Global Positioning System: Theory and Applications, Volume II, Ed by B. Parkinson, et al, 1996). When these transmitters use the GPS spectrum, as is the case for UAVs, PLs, and satellites providing ranging information, additional constructive interference is added. In the case of landing systems, a GPS receiver that is too near any one of the PLs will suffer interference. This effectively "drowns out" the reception from the other PLs as well the other GPS satellite signals. When this happens, the GPS receiver will be unable to track the satellites and therefore will be unable to provide PVT information. This is the Near-Far effect. Numerous solutions have been proposed and investigated to mitigate the PL interference, including pulsing the PLs. None of these solutions are as effective as the present invention.

In particular, the present invention is different from the "pulsing" PL solution described in the Elrod & Dierendonck reference cited above. The Pulsed PL technique with 10% duty cycle (transmitting 93 out of 1023 chips each cycle of the PL signal) may result in a 10 dB improvement in signal to interference level. This amount of improvement was suggested in Stansell, T. A., "Recommended Pseudolite Signal Specification," in Global Positioning System, vol-3, Institute of Navigation, 1994 also fully incorporated herein by reference. Such a 10 dB improvement is not sufficient in radio environments where PL signals are >30 dB higher than nominal GPS satellite signals. Moreover, if multiple PLs are used, then it becomes harder to maintain time slots for each of the PLs and also the oscillators of the PLs have to be very stable. This is discussed in Parkinson, B. W., Spilker, J. J., 1996 referenced above. It is important to note, however, that the present invention can also be used in conjunction with such pulsed pseudolite technology.

Identification and Mitigation of Spoofers

The present invention can be used to address spoofing and meaconing problems in two parts, identification and mitigation. A receiver 400 equipped with the invention naturally lends itself to identifying potential spoofers and meaconers. Simply, an interference resistant GPS receiver 400 according to the present invention will attempt to acquire and track a second or more fingers (i.e., substantially identical signals that are delayed in time due to, e.g., reflection, and/or deflection) for all active GPS processing channels. This technique is similar to those currently being used in the CDMA cell phone domain to acquire and track multipath signals.

When two channels of the receiver have good lock on the same PRN, one of the following three conditions is occurring: (i) multipath, (ii) spoofing, and/or (iii) meaconing.

Multipath may be, in general, distinguished from spoofing and meaconing due to substantial reduction in the power (i.e., signal strength) of received multipath signals. For example, intrachip multipath is not an issue since it just broadens the correlation peak. Additionally, GPS antennas are right circularly polarized, so multipath would have to reflect twice to be received. This decreases the power to roughly $1/(r^6)$, where r is range from the transmitter to the receiver. This power differential allows multipath to be identified and discarded, and the PVT solution proceeds as normal.

With multipath eliminated any spoofing and/or meaconing signals may be identified. If five or more unique PRNs are being tracked, the present invention simply eliminates the spoofing/real channel pair and calculates a PVT solution based on the other four PRNs being tracked. If a GPS receiver 400 (having the present invention) is coupled with an inertial navigation system (INS), then information provided by the INS may be used to identify the spoofer in the spoofing/real channel pair and solve the solution with the only four unique PRNs need to be originally tracked.

An implementation of the present invention for identification and mitigation of spoofing and/or meaconing is identical to that of FIG. 7 except that some channels 424 are devoted to finding fingers of the tracked and locked signals. The difference is that the finger(s) are at a different Doppler, phase and code offset but have the same PRN.

Although the present invention has been fully described in conjunction with the preferred embodiment with reference to the accompanying drawings, it is to be understood that various changes and modifications may be apparent to those skilled in the art. Such changes and modifications are to be understood as included within the scope of the present invention as defined by the appended claims.

APPENDIX

The GPS Near-Far Resistant (NFR) receiver is designed to be able to cancel interference from one or more strong GPS sources while attempting to acquire and track the signal from other GPS sources that are relatively weak.

In order to implement such a cancellation, one has to replicate the signals from the strong sources and then use them in a projection algorithm. The projection algorithms acts on the input data stream and generates a new data stream from which the strong signals are removed.

General flow of how NFR works in the GPS receiver:

The main receiver.m routine is in a constant loop where it will read a block of input data, then process that block for each GPS space vehicle. The NFR 'perp' function is performed for each space vehicle, after the data has been read, but before it is processed.

receiver.m calls remove_interferers.m, which returns a new copy of the input data, with the interference signals removed.

remove_interferers.m calls get_CAs.m, which generates the array of interference signals that will be removed from the raw input data.

get_CAs.m calls calc_CAchip.m, which returns the current C/A chip index.

calc_caPRN.m creates the C/A reference codes, which are placed into the 'caPRN' matrix and are subsequently indexed by the value returned from calc_Cachip.m.

Here is a graphical depiction of what is written above:

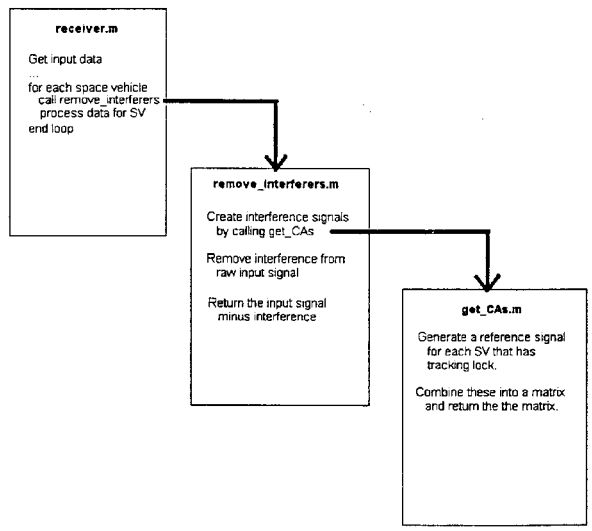

```
function [acqInfo,y]=remove_interferers(acqInfo,CA,caPRN,caSrch,caTrk,...
    flag,maxSVs,signal,sv,y)
%*************************************************************************
% Module Name:  remove_interferers
%
% Programmer:  Kent Krumvieda
%
% Creation Date:  27 September 2000
% Last Revision:  13 October 2000
%
% Module Abstract:  This MATLAB function will remove the structured
%    interference from the raw GPS signal.
%
% Values returned:
%    acqInfo -- acquisition information structure
%    y - signal with interference removed (if appropriate)
%
% Call syntax: y=remove_interferers(CA,caPRN,caSrch,caTrk,flag,maxSVs,
%    signal,y)
%
% Arguments:
%    acqInfo -- acquisition information structure
%    CA - structure containing CA code chipping rate, CA period and CA period length
%    caPRN - CA codes
%    caSrch - CA acquisition search structure
%    caTrk - ca track structure (see initCAtracks)
%    flag - flag structure
%    maxSVs - maximum number of PRNs
%    signal - signal operating parameters structure
%    sv -- PRN of interest
%    y - raw received GPS satellite signal
%
% Algorithim(s):  See 7018 Final Report
%
% Notes, Assumptions, & Restrictions:
%
% Subordinate Modules:  get_CAs
%
% Miscellaneous Comments:
%    Copyright (c) 2000 Data Fusion Corp, All Rights Reserved
%*************************************************************************
%---if appropriate remove the interference
    if (acqInfo.NFR)
%-------get the interference matrix
        S=get_CAs(CA,caPRN,caTrk,signal.fl,caSrch.corrLen,flag,...
            signal.iFreq,maxSVs,(1/signal.sFreq));
        if (isempty(S))
            acqInfo.NFR=0;
        else
%           y0=y;

SinvSS=S*inv(S'*S);
            y=y -SinvSS*(S'*y);
%           if (flag.debug==2)
%if(sv == 1)
%              y1=y;
%              env0=abs(ifft(fft(S).*conj(fft(y0))));
%              env1=abs(ifft(fft(S).*conj(fft(y1))));
%              figure(1); clf;
%              eval(['hold off']); plot(env0); hold; plot(env1,'r');
%              title('FFT Acq (blue=Acq, red=Perp out)');
%              keyboard;
%end;
%           end;
        end;
    end;
```

```
function SI=get_CAs(CA,caPRN,caTrk,cFreq,corrLen,flag,iFreq,maxSVs,tStep)
%***********************************************************************
% Module Name:   get_CAs
%
% Programmer:  Kent Krumvieda
%
% Creation Date:  08 March 1999
% Last Revision:  03 August 2001
%
% Module Abstract:  This MATLAB function will get the s (signal interference),
%   matrix.
%
% Values Returned:
%   S - (interference signal) used in the MSD correlation (in phase)
%
% Call Syntax: SI=get_CAs(CA,caPRN,caTrk,cFreq,corrLen,flag,iFreq,maxSVs,tStep)
%
% Arguments:
%   CA - CA code const structure (.chipRate, .period, .periodLen)
%   caPRN(maxSVs,1023) - ca "gold" codes
%     caTrk - ca track structure (see initCAtracks)
%   cFreq - carrier frequency
%   corrLen - correlation length
%     flag - flag structure
%   iFreq - intermediate frequency (could be baseband)
%   maxSVs -- maximum number of space vehicles
%     sv -- current PRN
%   tStep - time step
%
% Algorithim(s):  "Understand GPS Principles and Applications" by Elliott
%   D. Kaplan, Artech House Publishers, 1996.  ISBN 0-89006-793-7.
%
% Notes, Assumptions, & Restrictions:   This routine is for aquiring the
%   CA code only.
%
% Subordinate Modules:  calc_CAchip, msg
%
% Miscellaneous Comments:
%   Copyright (c) 1999-2000 Data Fusion Corp, All Rights Reserved
%***********************************************************************
%---initialize a few things
   SI=[];

%---create the s matrix
   for i=1:maxSVs
%-------only use if we have good lock
      if ((caTrk(i).init==(-1)) & (caTrk(i).plite==1))
         sI=zeros(corrLen,1);  %---in phase interference index=0;
         phi=caTrk(i).phi;
         G=caTrk(i).G;
         phiStep = 2*pi*(iFreq +caTrk(i).doppler)*tStep;
         gStep = tStep*(1 +(caTrk(i).doppler)/cFreq)*CA.chipRate;

%----------loop over the correlation length
         while (index < corrLen)

%---------------update the indexer
            index = index + 1;

%---------------get the chip info
               caChip = double(calc_CAchip(CA.periodLen,caPRN,G,i));

%---------------calc the interference signal
            sI(index,1) = sin(phi + pi*caChip);

%---------------move to next sample
```

```
            phi = phi + phiStep;
            G = G + gStep;

end;    %---end of while

%-----------append the data
        SI = [SI sI];

end;    %---end of caTrk if
end;    %---end of for
```

```
function []=receiver(c,CA,caPRN,caSrch,doppler,fid,flag,...
    maxSVs,NAV,navMsg,PY,Reg,signal,sim)
%*************************************************************************
% Module Name:   receiver
%
% Programmer:   Kent Krumvieda & Chad Cloman
%
% Creation Date:  25 January 1999
% Last Revision:  05 September 2001
%
% Module Abstract:  This MATLAB function will simulate the DFC receiver
%   architecture.
%
% Values Returned:
%
% Call Syntax:   []=receiver(c,CA,caPRN,caSrch,doppler,event,fid,flag,
%   maxSVs,NAV,navMsg,PY,Reg,signal,sim)
%
% Arguments:
%   c - speed of light from ICD-200
%   CA - CA code const structure (.chipRate, .period, .periodLen)
%   caPRN(maxSVs,1023) - ca "gold" codes
%   caSrch - CA Acquisition search structure
%   doppler -- doppler settings
%   fid - file id structure
%   flag - flag structure
%   maxSVs - maximum number of Space Vehicles (SVs)
%   NAV - nave data const structure (.bitRate, .periodLen)
%   navMsg - the navigation message
%   PY - P(Y) code const structure (.chipRate, .period)
%   Reg -- structure containing X1A, X1B, X2A, and X2B code epochs
%   signal -- signal operating parameters structure
%   sim -- simulation parameter structure
%
% Algorithim(s):  "Understand GPS Principles and Applications" by Elliott
%   D. Kaplan, Artech House Publishers, 1996. ISBN 0-89006-793-7.
%
% Notes, Assumptions, & Restrictions:
%
% Subordinate Modules:  read_signal,write_lockInfo
%
% Miscellaneous Comments:
%   Copyright (c) 1999-2001 Data Fusion Corp, All Rights Reserved
%*************************************************************************
    cnt = 0;

%---Used to store/write the I/Q data from tracking
    iqBufSize = 2048;
    ii{1,maxSVs} = [];
    qq{1,maxSVs} = [];
    iqCnt = zeros(1,maxSVs);

%---Delete any existing I/Q data
    IQwipe(maxSVs, flag, fid.out);

%CHAD
thePause = 15;
pauseInterval = 75;
cntInterval = 1;

%---get ready to acquire and track
    [acqInfo,caTrk,eventSwitch,trkInfo,trkPlotInfo]=initAcqNTrk(caSrch.corrLen,maxSVs);

%---create the event loop
   while flag.event cnt=cnt+1;
```

```
%CHAD
if (mod(cnt, cntInterval) == 0 | cnt == 1)
    disp(sprintf('cnt=%d', cnt))
end;

if (mod(cnt,pauseInterval) == 0)
    disp(sprintf('pausing %d seconds for memory management',thePause));
    pause(thePause);
    disp('pause done');
    %keyboard
end;

[SVsInView] = getSVsInView(fid.truth,flag,maxSVs,sim.prns);

%-------get the next set of data
        yy=read_signal(caSrch.corrLen,fid.signal,flag);
        if (isfinite(yy) == 0)
          flag.event = 0;
          break;
        end;

last_caTrk = caTrk;

%-------loop over all the PRNs
        for sv=1:maxSVs

%-----------are the SVs in view
            if (sim.skySrch | SVsInView(sv))
%---------------remove the structured interference from the signal
                [acqInfo(sv),y]=remove_interferers(acqInfo(sv),CA,caPRN,caSrch,...
                    last_caTrk,flag,maxSVs,signal,sv,yy);

%---------------switch based on PRN
                switch eventSwitch(sv)
                    case 1
%-----------------------acquire CA code
                        [acqInfo(sv),eventSwitch(sv)]=caAcquire(acqInfo(sv),...
                            CA,caPRN,caSrch,doppler,flag,maxSVs,signal,...
                            sv,SVsInView,y);

case 2
%-----------------------Track the visible Satellite signals
                        [acqInfo(sv),caTrk(sv),eventSwitch(sv),trkInfo(sv)]=track(acqInfo(
sv),...
                            CA,caPRN,caTrk(sv),flag,signal,sv,trkInfo(sv),doppler.binSize,
maxSVs,y);

case 3
%-----------------------acquire P code
                        eventSwitch=4;

case 4
%-----------------------track P code
                        eventSwitch=5;

case 5
%-----------------------perform navigation solution
                    otherwise
                        msg(flag,2,'invalid event loop switch.  Exiting...');
                        flag.event=0;
                end;    %---end of event switch
            end;    %---end of in-view if
        end;    %---end of sv for loop %-------Save tracking I/Q output (should be nav data)
        navPlotData = NaN * zeros(1,maxSVs);
        doTheNavPlot = 0;
```

```
      for bb = 1:maxSVs
        . if (caTrk(bb).init < 0)
            if (iqCnt(bb) <= 0)
               ii{1,bb} = zeros(1, iqBufSize);
               qq{1,bb} = zeros(1, iqBufSize);
            end;
            iqCnt(bb) = iqCnt(bb) + 1;
            ii{1,bb}(iqCnt(bb)) = caTrk(bb).CNo.It(end);
            qq{1,bb}(iqCnt(bb)) = caTrk(bb).CNo.Qt(end);
            if (iqCnt(bb) >= iqBufSize)
               msg(flag, 3, sprintf('sv %u: Writing I/Q data', bb));
               IQwrite(ii{1,bb}, qq{1,bb}, iqCnt(bb), bb, flag, fid.out);
               iqCnt(bb) = 0;
            end;
            navPlotData(bb) = caTrk(bb).CNo.It(end);
            doTheNavPlot = 1;
         end;
      end;

%-------plot FFT acquisition results using figure 2
      if (flag.plot)
         plotFFTAcq(acqInfo,caSrch,CA.period,flag,2);
         acqFFTPlotData(flag);      %---Clear data
      end;

%-------Plot vernier acquisition results using figures 7 & 8
      if (flag.plot)
         plotVernierAcq(flag,SVsInView,[7 8],acqInfo);
      end;

%-------plot the tracking results
         trkPlotInfo = plotTrk(caTrk,flag,maxSVs,trkInfo,trkPlotInfo);

%-------plot the navigation results
      if (doTheNavPlot)
         plotNav(navPlotData, maxSVs, 9, 800)
      end;

end;  %---end of event loop

%---Save remaining tracking I/Q output, if any
   for bb=1:maxSVs
      if (iqCnt(bb) > 0)
         msg(flag, 3, sprintf('sv %u: Writing final I/Q data', bb));
         IQwrite(ii{1,bb}, qq{1,bb}, iqCnt(bb), bb, flag, fid.out);
      end;
   end;

disp('end of program');
keyboard
```

```
function caPRN=calc_caPRN(caPeriodLen,flag,fnCodes,maxSVs)
%*******************************************************************
% Module Name:  calc_caPRN
%
% Programmer:  Kent Krumvieda
%
% Creation Date:  25 January 1999
% Last Revision:  11 September 2000
%
% Module Abstract:  This matlab function will calculate the first maxSVs
%    C/A PRN codes.  This routine was modified from G12.m written by
%    Capt. Juan Vasques.
%
% Values Returned:
%    caPRN(maxSVs,caPeriodLen) - the C/A codes for maxSVs space vehicles.
%        Note caPRN is a matrix of type unsigned integer 8.
%
% Call Syntax:  caPRN=calc_caPRN(caPeriodLen,flag,fnCodes,maxSVs)
%
% Arguments:
%    caPeriodLen - ca code period chip length
%    flag - flag structure
%    fnCodes -- file name for the C/A PRN codes, P code Registers and the
%        navigation messages
%    maxSVs - maximum number of SVi's (37)
%
% Algorithim(s):  "Understand GPS Principles and Applications" by Elliott
%    D. Kaplan, Artech House Publishers, 1996. ISBN 0-89006-793-7.
%
% Notes, Assumptions, & Restrictions:
%
% Subordinate Modules:  msg
%
% Miscellaneous Comments:
%    Copyright (c) 1999-2000 Data Fusion Corporation, all rights reserved
%*******************************************************************
%---display status message if desired
    msg(flag,3,'Calculating the CA code PRN sequences');

%---Code phase selection of G2 shift registers stored in look-up table 's'
    s =[2 6;3 7;4 8;5 9;1 9;2 10;1 8; 2 9;3 10;2 3;3 4;5 6;6 7;7 8;8 9;9 10;...
        1 4;2 5;3 6;4 7;5 8;6 9;1 3;4 6;5 7;6 8;7 9;8 10;1 6;2 7;3 8;4 9;...
        5 10;4 10;1 7;2 8;4 10];

caPRN=uint8(zeros(maxSVs,caPeriodLen));
    G1=zeros(1,caPeriodLen);
    G2i=zeros(1,caPeriodLen);

for i=1:maxSVs
%-------Register Initializations.
        g1 = ones(1,10);
        g2 = ones(1,10);

%-------loop over the number of chips in a C/A code period
        for j=1:caPeriodLen
%-----------obtain output at 12th bit.
            G1(j) = g1(10);
            G2i(j)=xor(g2(s(i,1)),g2(s(i,2)));
            caPRN(i,j)=xor(G1(j),G2i(j));

%-----------update feedback taps.
            g1new = xor(g1(3),g1(10));
            g2new = xor(xor(xor(xor(xor(g2(2),g2(3)),g2(6)),g2(8)),g2(9)),g2(10));

%-----------apply right shift and update (MSB) most significant bit
            g1=[g1new g1(1:9)];
            g2=[g2new g2(1:9)];
        end;
```

```
       end

%----verify that the codes are correct for all selected satellites
   if (flag.debug)
       msg(flag,3,'Verifing the CA code PRN sequences');

%-------First 10 chips of C/A Code for comparison to generated data
       first =[1440; 1620; 1710; 1744; 1133; 1455; 1131; 1454; 1626; 1504;...
               1642; 1750; 1764; 1772; 1775; 1776; 1156; 1467; 1633; 1715;...
               1746; 1763; 1063; 1706; 1743; 1761; 1770; 1774; 1127; 1453;...
               1625; 1712; 1745; 1713; 1134; 1456; 1713];   % given in octal %------loop over the maximum number of SVs
       for i=1:maxSVs
           f10=dec2bin(base2dec(num2str(first(i)),8));   % convert to binary
           for j=1:10
               caCode=double(caPRN(i,j));
               if(strcmp(f10(j),num2str(caCode)) == 0)
                   msg(flag,2,'C/A PRN code failed to verify');
           end;    %---end of verify if
         end;    %---end of j for
       end;    %---end of i for
     end;   %---end of debug if %---save the CA PRN matrix
   eval(['save ' fnCodes ' caPRN']);
```

```
function caChip=calc_CAchip(caPeriodLen,caPRN,G,SVi)
%**********************************************************************
% Module Name:  calc_CAchip
%
% Programmer:  Kent Krumvieda
%
% Creation Date:  11 March 1999
% Last Revision:  08 May 2000
%
% Module Abstract:  This MATLAB function will calculate the current
%   CA code chip.
%
% Values Returned:
%   caChip - Current CA code chip
%
% Call Syntax: caChip=calc_CAchip(caPeriodLen,caPRN,G,SVi)
%
% Arguments:
%   caPeriodLen - ca code period chip length
%   caPRN(maxSVs,caPeriodLen) - the C/A codes for maxSVs space vehicles
%   G -- current number of chips for the CA code which has elapsed
%   SVi -- current SV number
%
% Algorithim(s):  "Understand GPS Principles and Applications" by Elliott
%   D. Kaplan, Artech House Publishers, 1996. ISBN 0-89006-793-7.
%
% Notes, Assumptions, & Restrictions:
%
% Subordinate Modules:  none
%
% Miscellaneous Comments:
%   Copyright (c) 1999-2000 Data Fusion Corp, All Rights Reserved
%**********************************************************************
%---get a pointer into the CA code.  You must round and then take the
%---remainder, because if you take remainder and then round it changes
%---the dynamic range from 1:1023 to 1:1024.
    caPtr = rem(fix(G +100*eps),caPeriodLen);
%---get the CA code chip
    caChip = caPRN(SVi,caPtr+1);
```

```
function [c,CA,caPRN,caSrch,doppler,fid,flag,maxSVs,NAV,...
    navMsg,PY,Reg,signal,sim]=init_receiver
%************************************************************************
% Module Name:  init_receiver
%
% Programmer:  Kent Krumvieda
%
% Creation Date:  25 January 1999
% Last Revision:  06 June 2000
%
% Module Abstract:  This MATLAB function initialized the DFC receiver and
%   returns other parameters necessary to run a GPS simulation.
%
% Values Returned:
%   c - speed of light from ICD-200
%   CA - CA code const structure (.chipRate, .period, .periodLen)
%   caPRN(maxSVs,1023) - ca "gold" codes
%   caSrch - CA Acquisition search structure
%   doppler -- doppler settings
%   fid - file id structure
%   flag - flag structure
%   maxSVs - maximum number of Space Vehicles (SVs)
%   NAV - nave data const structure (.bitRate, .periodLen)
%   navMsg - the navigation message
%   PY - P(Y) code const structure (.chipRate, .period)
%   Reg -- structure containing X1A, X1B, X2A, and X2B code epochs
%   signal -- signal operating parameters structure
%   sim -- simulation parameter structure
%
% Call Syntax:  [c,CA,caPRN,caSrch,doppler,fid,flag,maxSVs,NAV,navMsg,PY,
%   Reg,signal,sim]=init_receiver
%
% Arguments:  none
%
% Algorithim(s):  "Understand GPS Principles and Applications" by Elliott
%   D. Kaplan, Artech House Publishers, 1996. ISBN 0-89006-793-7.
%
% Notes, Assumptions, & Restrictions:
%
% Subordinate Modules:  init_codes,init_transmitters,init_world,
%   msg,plot_symEnv,user_receiver_setup
%
% Miscellaneous Comments:
%   Copyright (c) 1999-2000 Data Fusion Corp, All Rights Reserved
%************************************************************************
%---get the user definable parameters
    [A,doppler,flag,fnCodes,fnOUT,fnSignal,fnTruth,iTime,...
        maxDwell,Pfa,sky_search,svTst,tDur,tStart]=user_receiver_setup;

%---initialize the PRN codes, data and registers
    [CA,caPRN,maxSVs,NAV,navMsg,PY,Reg]=init_codes(flag,fnCodes);

%---initialize the world
    [c,earth,num_Xmit,receiver,xmit_air,xmit_ground,...
        xmit_space]=init_world(flag);

%---get the time elapsed from beginning of GPS system time
    [startT]=get_GPStime(tStart);

%---create the IF signal
    [ADC,fidSig,fidTruth,signal]=init_transmitters(c,CA,caPRN,earth,...
        flag,fnSignal,fnTruth,maxDwell,maxSVs,NAV,navMsg,num_Xmit,...
        PY,receiver,Reg,startT,tDur,xmit_air,xmit_ground,xmit_space);

%---set up the CA code search structure
    caSrch=struct('A',A,...    %---tong search parameter
                'corrLen',round(signal.sFreq*CA.period*iTime),...   %---corr length
                'corrFFTLen', 0,...    %---next power of 2 >= corrLen
```

```
            'init',0,...   %---initialization flag
            'int',iTime,... %---integration time (msec)
            'maxDwell',maxDwell,...  %-- max dwell per search in tong
            'Pfa',Pfa,... %---single trail Pfa
            'svTst',svTst,...  %---unused PRN
            't',0);        %---current time
%---Next highest base 2 correlation length, so that we can zero-pad in order to
%---perform a fast radix-2 FFT instead of the slower version.  We had attempted
%---to use zero-padding with the acquisition FFT, but it didn't work.
%---Currently we do not use this value for anything, but we may want it in the
%---future, so I left it in.
   caSrch.corrFFTLen = round(2^(ceil(log2(caSrch.corrLen))));

%---set up simulation specific structure
   sim=struct('prns',sky_search.prns,... %---warm start
              'skySrch',sky_search.on,... %---sky_search flag
             'tStart',signal.tStart,... %---start of receiver sim
             'tStep',caSrch.corrLen/signal.sFreq,...  %---time step
             'tStop',signal.tStop);     %---stop time of receiver sim %---create doppler search vector
   doppler.binSize=2/(3*caSrch.int*CA.period);
   currDoppler=0;
   numDoppler=1;
   dopplerSearch(numDoppler)=currDoppler;
   while (currDoppler <= doppler.max)
      currDoppler=currDoppler+doppler.binSize;
      numDoppler=numDoppler+1;
      dopplerSearch(numDoppler)=currDoppler;
      numDoppler=numDoppler+1;
      dopplerSearch(numDoppler)= -1*currDoppler;
   end;

%---initialize the structure
    doppler.numbins=numDoppler;
    doppler.search=dopplerSearch;

if (fidSig > 0)
      fclose(fidSig);
   end;

%---set up the file ID structure
   fid = struct(...
          'out',fnOUT,...       %---base output filename -- we open as needed
          'signal',fnSignal,... %---signal file name
            'truth',fidTruth);    %---truth file ID
```

```
function [acqInfo,caTrk,eventSwitch,trkInfo,trkPlotInfo]=initAcqNTrk(corrLen,maxSVs)
%****************************************************************
% Module Name:  initAcqNTrk
%
% Programmer:  Kent Krumvieda & Chad Cloman
%
% Creation Date:  17 March 2000
% Last Revision:  03 Aug 2001
%
% Module Abstract:  This MATLAB function creates structures used by
%   the acquisition and tracking routines.
%
% Values Returned:
%   acqInfo -- acquisition information structure
%   caTrk - ca code tracking loop structure
%   eventSwitch - event loop switch
%   trkInfo - track information structure
%
% Call Syntax:  [acqInfo,caTrk,eventSwitch,trkInfo]=initAcqNTrk(corrLen,
%      maxSVs)
%
% Arguments:
%   corrLen - correlation length used in the trackers
%   maxSVs - maximum number of SVs
%
% Algorithim(s):
%
% Notes, Assumptions, & Restrictions:
%
% Subordinate Modules:  none
%
% Miscellaneous Comments:
%   Copyright (c) 2000-2001 Data Fusion Corp, All Rights Reserved
%****************************************************************
%---initialize the acquisition information
    acqInfo(1:maxSVs)=struct('doppler',NaN,...   %---doppler
                              'offset',NaN,...    %---time offset
                              'peak',0,...        %---normalize acq peak
                              'NFR',0);           %---NFR flag %---initialize the eventSwitch
    eventSwitch=ones(1,maxSVs);

%---define the track info structure
    M=10;        %---C/No - # of I&Q values used to calc normalized power
    K = 10;      %---C/No - # of normalized power values used to calc C/No
    lenVar = 60; %---length of variance calculations caTrk(1:maxSVs)=struct(...
        'corrLen',corrLen,...   %---correlation length -- # of samples per input
vector
        'doppler',NaN,...        %---Last Doppler estimate (Hz)
        'G',NaN,...              %---Current code chip offset (chips), non-integral
        'init',0,...             %---0=not in tracking, >0=Tsui FLL, -1=tracking
        'lock',0,...             %---lock info (-1=loss/acq, 0=init, 1=good lock)
        'm',0,...                %---# input vectors processed for tracking (resets after
acq ends)
        'n',1,...                %---# input vectors processed for tracking (never resets)
        'phi',NaN,...            %---phase angle of reference carrier (rad)
        'plite',0,...            %---true when this sv is a pseudolite
        'retryCount',0,...       %---tracking retry count--when nonzero we are in retry
mode
        'safetyNet',0,...        %---when nonzero, we have switched tracking modes and are
running in parallel
        'carrier',struct(...
            'dp',zeros(1,lenVar),... %---History of doppler for variance calc - may skip
some Doppler values
            'd',0,...            %---Count of doppler samples in 'dp' - may be greater
```

```
             than lenVar
                 'phaseErr',[0 0],...    %---Raw PLL phase error (rad) - current and previous,
         discriminator gain not applied
                 'f_phaseErr',0,...      %---Filtered PLL phase error (rad), VCO gain not
         applied
                 'freqErr',[0 0],...     %---Raw FLL frequency error (Hz) - current and
         previous, discriminator gain not applied
                 'f_freqErr',0,...       %---Filtered FLL frequency error (Hz), VCO gain not
         applied
                 'oldI',0,...            %---Previous I-channel value for FLL (not redundant!)
                 'oldQ',0,...            %---Previous Q-channel value for FLL (not redundant!)
                 'tCount',0,...          %---# input vectors processed since we began the current
         tracking type
                 'trackType',1),...      %---Current tracking type, 0=Unknown, 1=FLL Wide,
         2=FLL Narrow, 3=PLL Wide, 4=PLL Narrow
             'code',struct(...
                 'co',zeros(1,lenVar),... %---History of filtered code error for variance calc -
         may skip some values
                 'c',0,...               %---Count of samples in 'co' - may be greater than lenVar
                 'f_codeErr',0,...       %---Filtered code chip error (chips), VCO gain not
         applied
                 'codeErr',[0 0],...     %---Raw code chip tracking error (chips) - current and
         previous, discriminator gain not applied
                 'tCount',0,...          %---# input vectors processed since we began the current
         tracking type
                 'trackType',1),...      %---Current tracking type, 0=Unknown, 1=DLL Wide,
         2=DLL Narrow
             'CNo',struct(...
                 'k',0,...               %---counter for CNo calc -- the # of batches of size M
                 'It',zeros(1,M),...     %---In phase component history
                 'NP',zeros(1,K),...     %---Normalized power
                 'Qt',zeros(1,M))...     %---Quadrature phase component history
             );

%---We use this data for plotting
             trkInfo(1:maxSVs)=struct(...
                 'doppler',NaN,... %---last doppler returned by tracking (may be NaN if we did not
         have a Doppler)
                 'dopRate',NaN,...       %---current doppler rate
                 'offset',NaN,...        %---current offset
                 'phi',NaN);             %---current phase %---Tracking plot information
         %---NOTE:  The plotTrk() function has a switch statement containing "knowledge"
         %---       of the order of this structure (i.e., it knows Doppler Tracking is
         %---       first, Code Offset is second, etc.).  Thus, changes to the order,
         %---       meaning, or number of the cells will require a change to plotTrk().
         %---NOTE2: Changes to the window size must be made in both 'window' and 'data'.
             trkPlotInfo = struct(...
                 'window',{ 800, 300, 20, 20 },...
                 'cols',{ 1, 1, 2, 2 },...
                 'display',{ 1, 1, 0, 0 },...
                 'figNum',{ 3, 4, 5, 6 },...
                 'title',{ 'Doppler Tracking','Code Offset', 'Doppler Rate Tracking', 'Phase
         Tracking' },...
                 'data', { zeros(maxSVs,800), zeros(maxSVs,300), zeros(maxSVs,20), zeros(maxSVs,20)
         },...
                 'cnt', { zeros(1,maxSVs), zeros(1,maxSVs), zeros(1,maxSVs), zeros(1,maxSVs) });
```

What is claimed is:

1. A method for determining navigation information, comprising:

receiving a composite signal (y), wherein y includes, from each of a plurality of signaling sources, a corresponding wireless signal including navigation data;

obtaining, for each signal of one or more of said corresponding wireless signals, corresponding signal modeling data indicative of the signal;

performing a projection, of a representation of y, onto a subspace that is orthogonal to a space spanning a representation of at least one signal ($s_0$) of the one or more corresponding wireless signals, said space determined using said corresponding signal modeling data for $s_0$, and wherein said subspace is non-orthogonal to a representation of another signal ($h_0$) of said corresponding signals;

using a result from said step of performing for acquiring said another corresponding signal $h_0$;

first determining, after acquiring said another corresponding signal $h_0$, said navigation data from said another corresponding signal $h_0$; and second determining navigation information using said navigation data from a plurality of said signaling sources including said signaling source for said another corresponding signal $h_0$.

2. The method of claim 1, wherein said receiving step includes receiving one or more of said corresponding signals from at least one of: a satellite, a pseudolite, an aerial vehicle;

wherein said navigation data includes one or more of: a telemetry word, hand-over word, clock corrections, SV health/accuracy, ephemeris parameters, almanac data, ionospheric model data and coordinated universal time data;

wherein said navigation information includes data identifying one or more of: a position, a velocity and time for an antenna used in performing said step of receiving.

3. The method of claim 1, further including a step of: first performing at least one of the following steps of acquiring and tracking said corresponding wireless signal $s_0$; and performing said steps of claim 1 following said receiving step, wherein for at least one of said one or more corresponding wireless signals, said corresponding signal modeling data includes at least some of: a pseudo-random number, code offset data, a phase, Doppler data, code offset rate, phase rate, and Doppler rate obtained from said step of first performing.

4. The method of claim 3, wherein said step of first performing includes performing only said step of acquiring.

5. The method of claim 3, wherein said corresponding signal modeling data for $s_o$ includes at least most of: a pseudo-random number, code offset data, a phase, Doppler data, code offset rate, phase rate, and Doppler rate.

6. The method of claim 1, wherein said step of obtaining includes at least one of acquiring and tracking each signal of the one or more of said corresponding wireless signals.

7. The method of claim 1 further including a step of creating, from said modeling data for $s_0$, additional signal data dependent upon a pseudorandom noise code for $s_0$, wherein said space is determined using said additional signal data.

8. The method of claim 1, further including a step of identifying the signal $s_0$ of said one or more corresponding wireless signals as an interfering signal.

9. The method of claim 1, wherein said corresponding signal modeling data for $s_0$ is dependent upon one or more of: (a) coarse acquisition code and a carrier frequency, and (b) a coarse acquisition code, a precise positioning code and a carrier frequency.

10. The method of claim 1, wherein said step of receiving includes receiving the composite signal y at a single antenna element.

11. The method of claim 1, wherein said step of obtaining includes for each of said one or more corresponding wireless signals, a step of obtaining, as at least part of said corresponding signal modeling data, two or more of: a pseudo-random number, code offset data, a phase, Doppler data, code offset rate, phase rate, and Doppler rate.

12. The method of claim 1 further including a step of accessing a threshold criteria for identifying the signal $s_0$ as an interfering signal, wherein said threshold criteria includes one of: (a) a predetermined number of the strongest of said corresponding signals, (b) a predetermined decibel increase above a predetermined value, (c) a signal to noise ratio, (d) a signal to carrier ratio, (e) a carrier to noise ratio, (f) relative amplitude and (g) a weighted sum of two or more of (a) through (f).

13. The method of claim 12 further including a step of at least one of tracking and acquiring the signal $s_0$ prior to performing said step of accessing, wherein information from the at least one step of tracking and acquiring is used in said step of accessing.

14. The method of claim 1, further including a step of constructing an in-phase reference signal from said signal modeling data for $s_0$, wherein said in-phase reference signal is used to determine said space.

15. The method of claim 14, wherein said step of constructing includes using said corresponding signal modeling data for $s_o$ to create an in phase interference reference signal having the following representation:

$$s_{i_{CA}}(\omega t) = [G_i(t)]\sin(\omega t)$$

where $G_i(t)$ is a GPS Coarse Acquisition (C/A) code's $i^{th}$ chip at time t, and $\omega$ is a carrier frequency for $s_0$.

16. The method of claim 1, wherein said step of performing includes computing said projection for canceling a contribution of $s_0$ to said result, wherein the subspace is representable by a matrix G whose columns span the subspace, said subspace including a portion of said another corresponding signal $h_0$, wherein said portion is perpendicular to $s_0$.

17. The method of claim 16, wherein $G=P_S^\perp H$ such that H is a representation of said another corresponding signal $h_0$ and $P_S^\perp = I - P_S$ is the orthogonal projection operator matrix that takes an input and projects the input onto a space spanned by the columns of the matrix perpendicular to the matrix S determined from a representation of a collection of one or more of the wireless signals of said composite signal, wherein said collection interferes with the signal $h_0$.

18. The method of claim 1, wherein said step of performing includes third determining said result as $\tilde{y}=P_S^\perp y$, wherein (1) $P_S^\perp = I - P_S$ is an orthogonal projection matrix operator for projecting an input onto the subspace orthogonal to the space, said space spanned by the columns of a matrix S, wherein $S=[s_1\ s_2\ \ldots\ s_N]$, such that for each $s_i$ of S, $s_i$ includes a representation of one of the corresponding wireless signals identified as an interfering signal i, and (2) $P_S = S(S^T S)^{-1} S^T$ is a matrix operator for performing a projection that takes an input and projects the input onto a space spanned by the matrix S, where S includes a representation of $s_o$ as a subspace.

19. The method of claim 18, wherein subsequent to said step of third determining a further step of determining $$z = H^T \bar{y}$$

wherein H is a representation of said another corresponding signal $h_0$, and wherein z is used to determine if said another corresponding signal is present in a subsequent instance of the composite signal y.

20. The method of claim 1, wherein said navigation data includes: a telemetry word, hand-over word, clock corrections, SV health/accuracy, ephemeris parameters, almanac, ionospheric model and coordinated universal time data.

21. The method of claim 1, wherein said navigation information includes one or more of a position, velocity and time corresponding to a location of a device performing at least said step of receiving.

22. The method of claim 1, wherein said corresponding wireless signals includes GPS signals.

23. The method of claim 1, further including a step of coupling with an inertial navigation system.

24. A method for determining navigation information, comprising:
provinding a navigation device that performs (a) through (i) following:
(a) receives a composite signal (y), wherein y includes, from each of a plurality of signaling sources, a corresponding wireless signal including navigation data;
(b) obtains, for each signal of one or more of said corresponding wireless signals, corresponding signal modeling data indicative of the signal;
(c) performs projection, of a representation of y, onto a subspace that is orthogonal to a space spanning a representation for at least one signal ($s_0$) of the one or more corresponding wireless signals, wherein said space is determined using said signal modeling data for $s_0$, and wherein said subspace is non-orthogonal to a representation of another signal ($h_0$) of said corresponding signals;
(d) uses a result from (c) for acquiring the another corresponding signal $h_0$;
(e) first determines said navigation data from the another corresponding signal $h_0$; and
(f) second determines navigation information using said navigation data from a plurality of said signaling sources including said signaling source for the another corresponding signal $h_0$.

25. The method of claim 24, wherein said step of providing includes incorporating into said navigation device an analog to digital converter having a dynamic range effective for capturing a digital representation of each of said corresponding signals.

26. The method of claim 23, wherein said step of providing includes incorporating into said navigation device a data store for storing said signal modeling data including one or more of: (a) a pseudo-random number, (b) code offset data, (c) phase and Doppler data, (d) code offset rate, (e) phase rate, (f) Doppler rate, and (g) at least one bit that can be toggled between being set and being unset depending on whether $s_0$ has been labeled an interferer or not.

27. The method of claim 24, wherein said navigational device stores information indicative of the signal $s_0$ being an interfering signal.

28. The method of claim 24, wherein said navigation device performs (d) after previously acquiring said another corresponding signal $s_0$.

29. The method of claim 24, wherein said corresponding signal modeling data for each signal of said one or more corresponding wireless signals includes two or more data items of: a pseudo-random number, code offset data, a phase, Doppler data, code offset rate, phase rate, and Doppler rate;
wherein said two or more data items for the signal $s_0$ are used in determining said subspace.

30. The method of claim 29, wherein said navigation device uses, for the signal $s_0$, said corresponding signal modeling data to create an in phase interference reference signal for so having the following representation:

$$s_{i_{CA}}(\omega t) = [G_i(t)]\sin(\omega t)$$

where $G_i(t)$ is a GPS Coarse Acquisition (C/A) code's $i_{th}$ chip at time t, and $\omega$ is a carrier frequency for $s_0$.

31. The method of claim 24, wherein said navigational device includes only one antenna element for receiving the composite signal.

32. A method for determining navigation information, comprising:
receiving a composite signal (y), wherein y includes, from each of a plurality of GPS signaling sources, a corresponding GPS signal;
for at least one of said GPS signaling sources, first performing at least one of the steps of acquiring and tracking the corresponding GPS signal($s_0$) for the at least one GPS signaling source;
obtaining signal modeling data indicative of substantially only the GPS signal $s_0$;
second performing an orthogonal projection, of a representation of y, onto a subspace that is orthogonal to a space spanning a representation of the GPS signal, said space determined using said signal modeling data, and wherein said subspace is non-orthogonal to a representation of a second GPS signal of the corresponding GPS signals;
using a result from said step of second performing for acquiring the second GPS signal;
first determining said navigation data from the second GPS signal; and
second determining navigation information using said navigation data from a plurality of said signaling sources including said signaling source for the second GPS signal.

33. The method of claim 28, wherein said step of first performing must be performed prior to said step of obtaining.

34. The method of claim 28, further including a step of constructing an in-phase reference signal from said signal modeling data for $s_0$, wherein said in-phase reference signal is used to determine said space.

35. The method of claim 28, further including a step of counting a number of times that an evaluation relative to a threshold criteria identifies the signal $s_0$ as an interfering signal.

36. The method of claim 35 further including a step of accessing the threshold criteria, wherein said threshold criteria includes one of: (a) a predetermined number of the strongest of said corresponding GPS signals, (b) a predetermined decibel value of $s_0$, (c) a signal to noise ratio, (d) a signal to carrier ratio, (e) a carrier to noise ratio, (f) relative amplitude and (g) a weighted sum of two or more of (a) through (f).

37. A navigational system, comprising:
an antenna for receiving a composite navigation signal (y); and an interference processing channel for performing the following steps:
(a) obtaining, for at least one signal ($s_0$) of one or more of individual signals of y, signal modeling data indicative of the individual signal $s_0$;
(b) performing projection, of a representation of y, onto a subspace that is orthogonal to a space spanning a representation of $s_0$, wherein said subspace is non-orthogonal to a representation of a particular one of the individual signals for which $s_0$ is an interfering signal;
(c) using a result from (b) for acquiring the particular signal; and
(d) determining navigation data from the particular signal.

38. The navigation system of claim 37, wherein one or more of said individual signals are GPS signals.

39. The navigational system of claim 37, wherein said interference processing channel includes a data store for storing said modeling data, wherein said modeling data includes at least some of: a pseudo-random number, code offset data, a phase, Doppler data, code offset rate, phase rate, and Doppler rate.

40. The navigational system of claim 37, wherein said space is determined using said signal modeling data.

41. The navigational system of claim 40, wherein said interference processing channel determines said result from said step (b) by performing computations representative of $\hat{y} = P_S^\perp y$, wherein: (1) $P_S^\perp = I - P_S$ is an orthogonal projection matrix operator for projecting an input onto a space orthogonal to a space spanned by the columns of a matrix S, wherein $S = [s_1\ s_2\ \ldots\ s_N]$, such that for each $s_i$ of S, $s_i$ includes a representation of one of the corresponding wireless signals identified as an interfering signal, and (2) $P_S = S(S^T S)^{-1} S^T$ is a matrix operator for performing the orthogonal projection that takes an input and projects the input onto a space spanned by the matrix S, where S includes a representation of $s_0$ as a subspace.

42. The navigational system of claim 37, further including a single antenna element for receiving the navigation signal y.

43. The navigation system of claim 37, further including a counting component for determining a number of times that an evaluation relative to a threshold criteria identifies the signal $s_0$ as an interfering signal.

44. The navigation system of claim 37, wherein said interference processing channel includes a digital receiver channel and a receiver processing component for at least one of acquisition and tracking of $s_0$;
wherein said receiver processing component provides one or more of: a loop discriminator and filter, a data demodulation, a meters, and a phase lock loop.

45. The navigation system of claim 36, further including a navigation processing component for determining one or more of: a position, a velocity and time for said antenna.

46. The navigational system of claim 37, further including one of a navigation augmentation system and a landing system for providing at least of ranging information and differential information to said interference processing channel.

47. A navigational receiver, comprising:
an antenna for receiving a composite navigation signal (y); and
an interference processing channel means for performing the following steps:
(a) obtaining, for each signal of one or more of individual signals of y, corresponding signal modeling data indicative of the individual signal;
(b) identifying at least one of the individual signals ($s_0$) as an interfering signal;
(c) performing projection, of a representation of y, onto a subspace that is orthogonal to a space spanning a representation of $s_0$, said subspace determined using said corresponding signal modeling data for $s_0$, and wherein said subspace is non-orthogonal to a representation of another one of the individual signals for which $s_0$ is an interfering signal;
(d) using a result from (c) for acquiring said another signal; and
(e) determining navigation data from said another signal.

48. The navigational receiver of claim 47, wherein:
said interference processing channel means includes a data store for storing said corresponding signal modeling data for $s_0$, wherein said corresponding signal modeling data for $s_0$ includes at least some of: a pseudo-random number, code offset data, a phase, Doppler data, code offset rate, phase rate, and Doppler rate;
said interference processing channel means includes a counting component for determining a number of times that an evaluation relative to a threshold criteria identifies the signal $s_0$ as an interfering signal;
said interference processing channel means includes a digital receiver channel and a receiver processing component for at least one of acquisition and tracking of $s_0$; and
further including a navigation processing component for determining one or more of: a position, a velocity and time for said antenna.

49. The navigational receiver of claim 47, wherein said antenna has a single antenna element for receiving the composite navigation signal.

* * * * *